US010554906B2

United States Patent
Kim et al.

(10) Patent No.: US 10,554,906 B2
(45) Date of Patent: Feb. 4, 2020

(54) MOBILE TERMINAL CAPABLE OF EXECUTING SPLICE MODE FOR DISPLAYING PREVIEW IMAGE REGION AND SPLICE REGION AND CONTROLLING METHOD THEREOF

(71) Applicant: LG ELECTRONICS INC., Seoul (KR)

(72) Inventors: Youngwoo Kim, Seoul (KR); Songyi Baek, Seoul (KR); Sohoon Yi, Seoul (KR); Jeyeol Lee, Seoul (KR); Jaeho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/897,870

(22) Filed: Feb. 15, 2018

(65) Prior Publication Data
US 2018/0234639 A1 Aug. 16, 2018

(30) Foreign Application Priority Data
Feb. 15, 2017 (KR) ........................ 10-2017-0020523

(51) Int. Cl.
*H04N 5/262* (2006.01)
*H04N 5/222* (2006.01)
(Continued)

(52) U.S. Cl.
CPC ...... *H04N 5/2621* (2013.01); *H04M 1/72527* (2013.01); *H04N 5/2224* (2013.01); *H04N 5/23293* (2013.01); *H04N 5/2624* (2013.01); *H04M 2250/20* (2013.01); *H04M 2250/52* (2013.01); *H04N 5/2628* (2013.01)

(58) Field of Classification Search
CPC .. H04N 5/2621; H04N 1/3871; H04N 1/3876; H04N 5/2224; H04N 5/23293; H04N 5/2624; G09G 5/14; H04M 1/72527
See application file for complete search history.

(56) References Cited

U.S. PATENT DOCUMENTS

2014/0181745 A1 6/2014 Cui
2015/0062291 A1 3/2015 Kim et al.
(Continued)

FOREIGN PATENT DOCUMENTS

WO 2016030878 3/2016

OTHER PUBLICATIONS

European Patent Office Application Serial No. 18156733.0, Search Report dated Jun. 19, 2018, 9 pages.

*Primary Examiner* — Nicholas G Giles
(74) *Attorney, Agent, or Firm* — Lee, Hong, Degerman, Kang & Waimey

(57) ABSTRACT

Disclosed are a mobile terminal and controlling method thereof. The present invention includes a sensing unit, a camera, a display unit, and a controller configured to launch a camera application, wherein the controller is further configured to execute a splice mode on the camera application, wherein the splice mode is a mode for outputting a preview image region and a splice region to the display unit by partitioning, and wherein the controller is further configured to output a preview image currently shot through the camera to the preview image region and recommend a splice image outputted to the splice region based on the outputted preview image.

19 Claims, 29 Drawing Sheets

(51) Int. Cl.
*H04N 5/232* (2006.01)
*H04M 1/725* (2006.01)

(56) References Cited

U.S. PATENT DOCUMENTS

| | | |
|---|---|---|
| 2015/0062434 A1 | 3/2015 | Deng et al. |
| 2015/0254044 A1 | 9/2015 | Cho et al. |
| 2017/0084066 A1* | 3/2017 | Furuya .................... G06T 11/60 |
| 2017/0256040 A1* | 9/2017 | Grauer ............... H04N 1/00196 |

* cited by examiner

MOBILE TERMINAL CAPABLE OF EXECUTING SPLICE MODE FOR DISPLAYING PREVIEW IMAGE REGION AND SPLICE REGION AND CONTROLLING METHOD THEREOF

CROSS-REFERENCE TO RELATED APPLICATION

Pursuant to 35 U.S.C. § 119(a), this application claims the benefit of earlier filing date and right of priority to Korean Application No. 10-2017-0020523, filed on Feb. 15, 2017, the contents of which are all hereby incorporated by reference herein in its entirety.

BACKGROUND OF THE INVENTION

Field of the Invention

The present invention relates to a mobile terminal and controlling method thereof, and more particularly, to a mobile terminal and controlling method thereof, suitable for executing a splice mode for outputting a preview image region and a splice region on a camera application.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of the terminal are getting diversified, the terminal tends to be implemented as a multimedia player provided with complex functions such as photographing of photos or videos, playback of music or video files, game play, broadcast reception and the like for example.

Efforts are ongoing to support and increase the functionality of mobile terminals. Such efforts include software and hardware improvements, as well as changes and improvements in the structural components.

Recently, an image is generally captured by a camera built in a mobile terminal. Yet, a mobile terminal just provides a function of applying a filter to an image or a function of zooming in to or out from an image in the course of photographing, and provides a function of editing the captured image after completion of the photographing only.

Moreover, a recent mobile terminal is provided with a function of creating a fun image by splicing an image to an already captured image through various camera applications.

Therefore, users may demand a function of automatically recommending an image that may be funny if combined with a preview image in the course of shooting an image or video.

SUMMARY OF THE INVENTION

Accordingly, an object of the present invention is to address the above-noted and other problems.

Another object of the present invention is to provide a mobile terminal and controlling method thereof, which outputs a preview image region for outputting a preview image currently shot through a camera on a camera application and a splice region for outputting a splice image recommended on the basis of the outputted preview image.

To achieve these objects and other advantages and in accordance with the purpose of the invention, as embodied and broadly described herein, the present invention provides in one aspect a mobile terminal, including a sensing unit, a camera, a display unit, and a controller configured to launch a camera application, wherein the controller is further configured to execute a splice mode on the camera application, wherein the splice mode is a mode for outputting a preview image region and a splice region to the display unit by partitioning, and wherein the controller is further configured to output a preview image currently shot through the camera to the preview image region and recommend a splice image outputted to the splice region based on the outputted preview image.

According to one aspect of the present invention, the mobile terminal may further include a memory and a wireless communication unit, and the controller may obtain the splice image through the memory (e.g., gallery) or the wireless communication unit (e.g., web browser, SNS, external DB).

According to one aspect of the present invention, the controller may recommend the splice image based on at least one selected from an outline, color and category of the preview image.

According to one aspect of the present invention, the controller may pan, rotate, enlarge or reduce at least one of the recommended splice image and the preview image based on the splice image or the preview image.

According to one aspect of the present invention, at least one of pan, rotation, enlargement or reduction of the splice image or the preview image may be performed based on a user's input.

According to one aspect of the present invention, the controller may recommend a first splice image based on the outline of the preview image, output the recommended first splice image to the splice region, and recommend a second splice image based on the outline of the preview image if sensing a first input signal for selecting the first splice image.

According to one aspect of the present invention, the controller may extract an outline of at least one of the recommended splice image and the preview image and pan, rotate, enlarge or reduce at least one of the splice image and the preview image based on the extracted outline.

According to one aspect of the present invention, the controller may recommend a third splice image based on the color of the preview image, output the recommended third splice image to the splice region, and change a color of at least one of the preview image and the third splice image if sensing a second input signal for selecting the preview image or the third splice image.

According to one aspect of the present invention, if sensing the second input signal, the controller may extract at least one color included in the preview image or the third splice image, output the extracted color list, and change the color of at least one of the preview image and the third splice image based on a color selected from the extracted color list.

According to one aspect of the present invention, the controller may recommend a fourth splice image based on the category of the preview image, output the recommended fourth splice image to the splice region, recommend a fifth splice image having the same category of the fourth splice image if sensing a third input signal for selecting the fourth splice image in a first direction, and recommend a sixth splice image having a category different from that of the fourth splice image if sensing a fourth input signal for selecting the fourth splice image in a second direction.

According to one aspect of the present invention, the wireless communication unit may include a location information module and the controller may determine a location, at which the preview image is shot, through the location information module and recommend the splice image based on the location.

According to one aspect of the present invention, the controller may detect a direction of a first subject contained in the splice image and a direction of the mobile terminal and output a popup indicating to change the direction of the mobile terminal based on the direction of the first subject to the preview image.

According to one aspect of the present invention, the controller may detect a direction of a second subject contained in the preview image, rotate the preview image based on the detected direction of the second subject, and output a popup indicating to change the direction of the mobile terminal based on the direction of the second subject.

According to one aspect of the present invention, the controller may detect at least one of a moving speed and a direction of a third subject contained in the preview image and control the splice image to move based on at least one of the moving speed and direction of the third subject.

According to one aspect of the present invention, if sensing a fifth input signal for selecting the preview image or the splice image, the controller may change the selected preview or splice image.

According to one aspect of the present invention, while the preview image and the splice image are outputted, if a rotation of the mobile terminal is detected, the controller may control the splice image region not to be rotated automatically.

According to one aspect of the present invention, the controller may create a single image by splicing the outputted preview image and the recommended splice image together and save at least one of the preview image, the splice image and the created image.

According to one aspect of the present invention, the controller may share at least one of the preview image, the splice image and the created image with an external device or server through the wireless communication unit.

In another aspect, the present invention provides a method of controlling a mobile terminal, including launching a camera application, executing a splice mode on the camera application, the splice mode comprising a mode for outputting a preview image region and a splice region to the display unit by partitioning, outputting a preview image currently shot through the camera to the preview image region, and recommending a splice image outputted to the splice region based on the outputted preview image.

Accordingly, the present invention provides the following effects and/or features.

According to at least one of embodiments of the present invention, while a currently shot preview image is outputted to a preview image region, a mobile terminal checks a splice image recommended on the basis of a preview image and advantageously create a connected image in consideration of both of the preview image and the splice image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
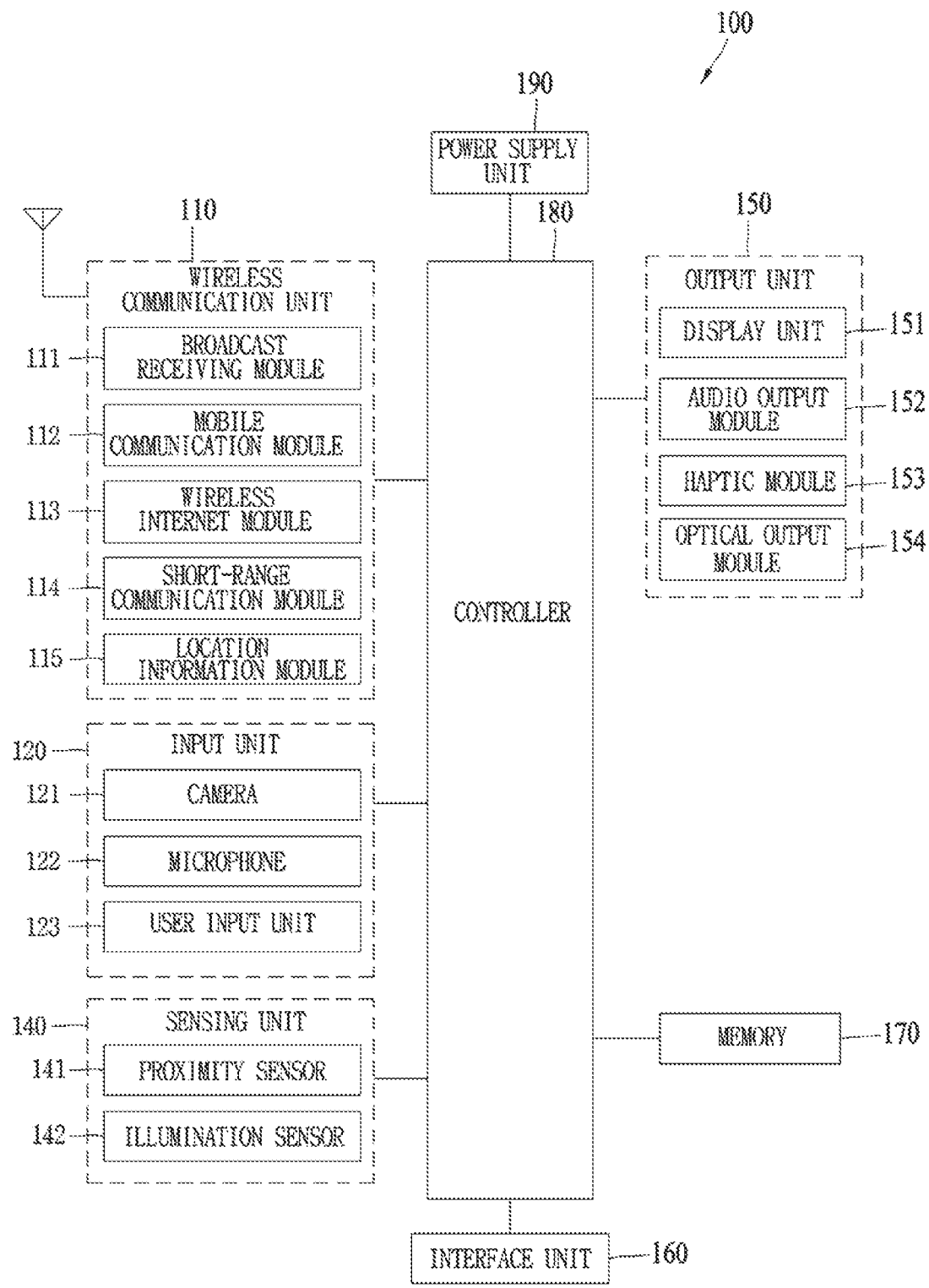
FIG. 1A is a block diagram of a mobile terminal in accordance with the present disclosure.
Figure 1B:
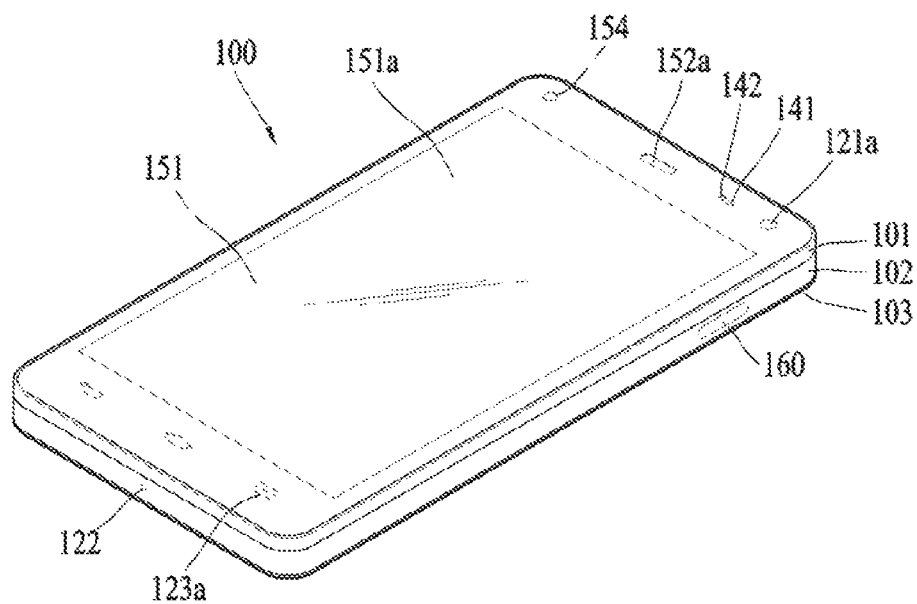
FIGS. 1B and 1C are conceptual views of one example of the mobile terminal, viewed from different directions.
Figure 1C:
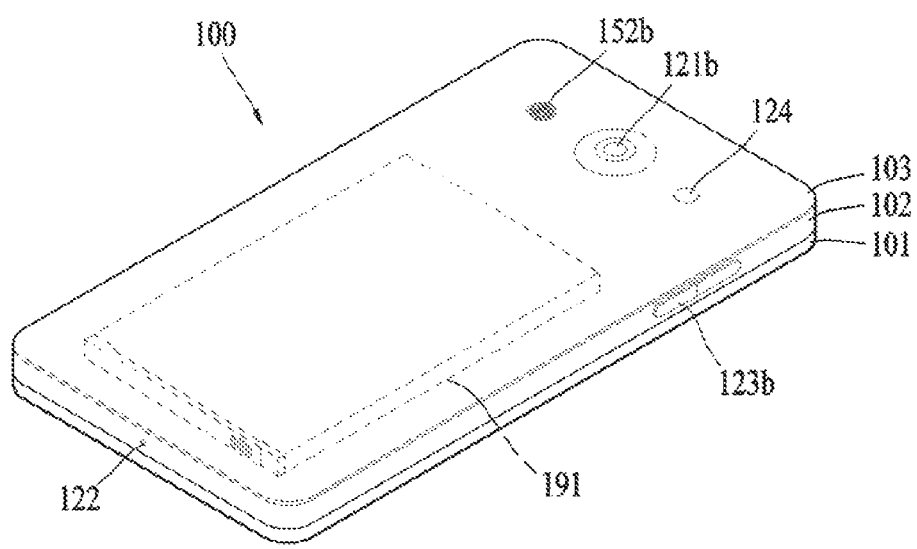

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
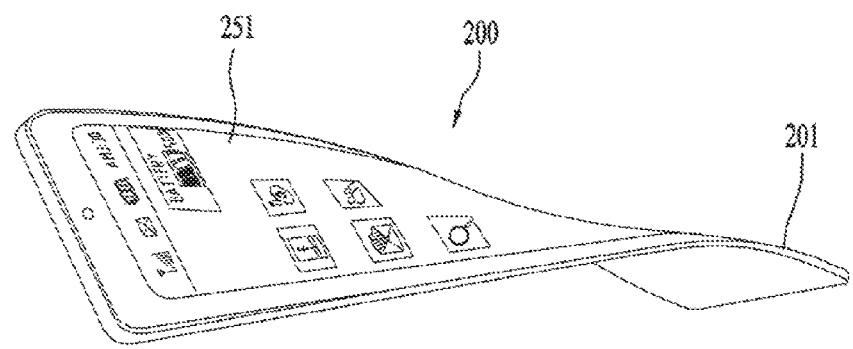
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
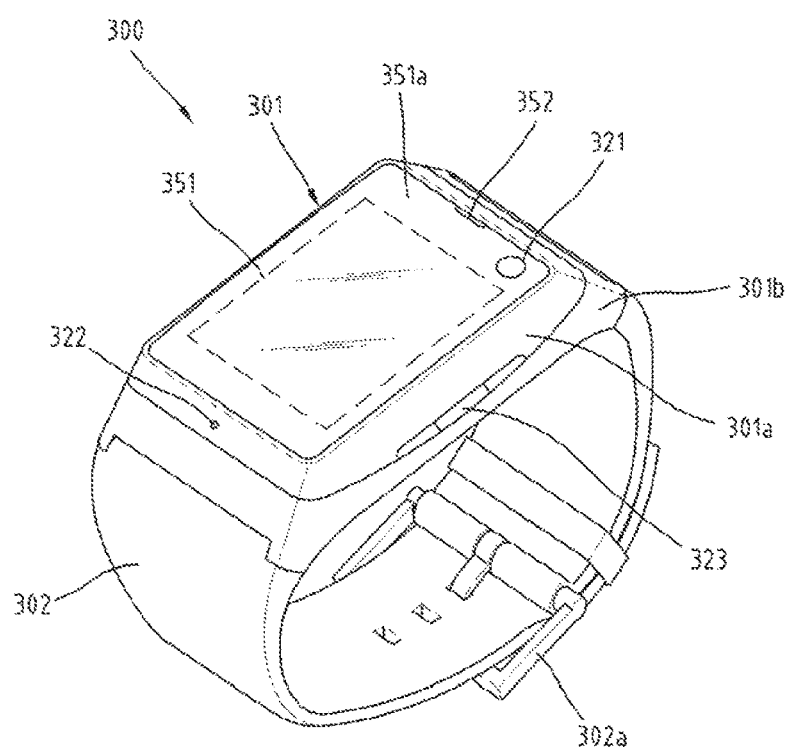
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

In the following description, embodiments related to a controlling method implementable in the above-configured mobile terminal shall be described with reference to the accompanying drawings. It will be appreciated by those skilled in the art that the present invention can be specified into other form(s) without departing from the spirit or scope of the inventions.

In the following description with reference to FIGS. 4 to 29, a mobile terminal can be embodied into one of the mobile terminals 100, 200 and 300 shown in FIGS. 1 to 3.

In the following description, embodiments of the present invention are described in detail with reference to FIG. 4 to FIG. 29. In describing and understanding embodiments of the present invention, the former description with reference to FIGS. 1 to 3 can be referred to.

Figure 4:
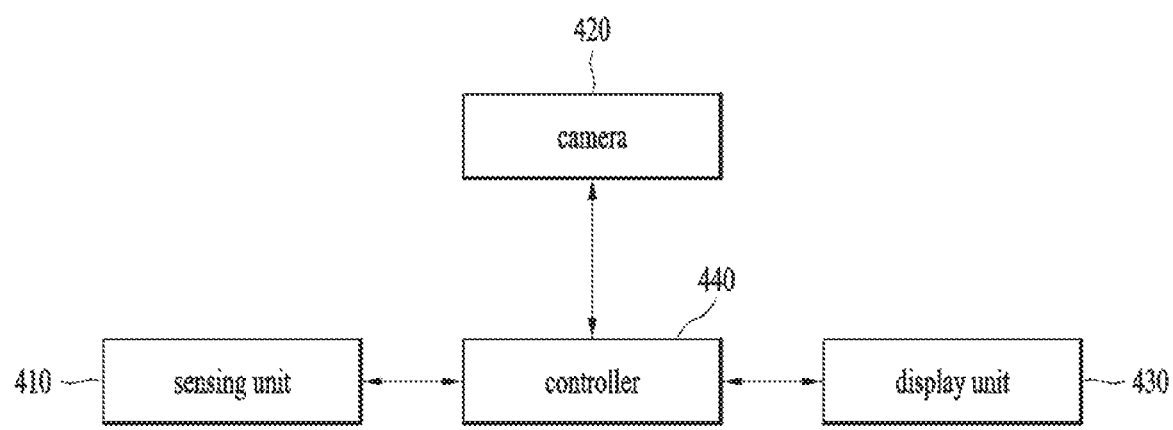
FIG. 4 is a block diagram to describe configuration modules of a mobile terminal according to one embodiment of the present invention.

FIG. 4 is a block diagram to describe configuration modules of a mobile terminal according to one embodiment of the present invention.

Referring to FIG. 4, a mobile terminal according to one embodiment of the present invention may include a sensing unit 410, a camera 420, a display unit 430, and a controller 440.

The sensing unit 410 senses use's various inputs to the mobile terminal and an environment of the mobile terminal and then delivers a sensing result to enable to controller 440 to perform a corresponding operation. According to the present invention, the sensing unit 410 may be provided to the display unit 430 so as to be embodied into a touchscreen. According to the present invention, the sensing unit 410 can be embodied in the sensing unit 140 shown in FIG. 1A.

According to one embodiment of the present invention, the sensing unit 410 can sense a touch input signal from a user. In doing so, the sensing unit 410 can sense a touch input signal sensed point, a touched size and the like together. Moreover, the sensing unit 410 can sense a multi-touch input signal. Particularly, the sensing unit 410 can sense a touch input signal of two or more points within a preset time range at a time.

Moreover, the sensing unit 410 can sense a movement of the mobile terminal. For example, the sensing unit 410 can sense a horizontal or vertical rotation of the mobile terminal.

The camera 420 can process or handle an image frame of a still image, a moving image or the like obtained by an image sensor. The processed image frame can be displayed on the display unit 430 or saved to the memory 170. According to one embodiment of the present invention, the camera 420 can be focused on a subject contained in a still or moving image.

The display unit 430 can display visual information. In this case, the visual information may include text, indicator, icon, content, application, image, video and the like. The display unit 430 can output visual information to a screen based on a control command of the controller 440. According to the present invention, the display unit 430 can be embodied in the display 151 shown in FIG. 1A or the display unit 430 shown in FIG. 3A.

According to one embodiment of the present invention, the display unit 430 can output a currently run camera application. And, the display unit 430 can distinguishably output a preview region and a splice region within the camera application.

The controller 440 processes data, controls the aforementioned respective units of the mobile terminal, and controls data transmissions/receptions among the units. According to the present invention, the controller 440 can be embodied in the controller 180 shown in FIG. 1A.

According to one embodiment of the present invention, operations performed by the mobile terminal can be controlled by the controller 440. Yet, for clarity of the following description, such operations are described as performed/controlled by the mobile terminal in general.

Figure 5:
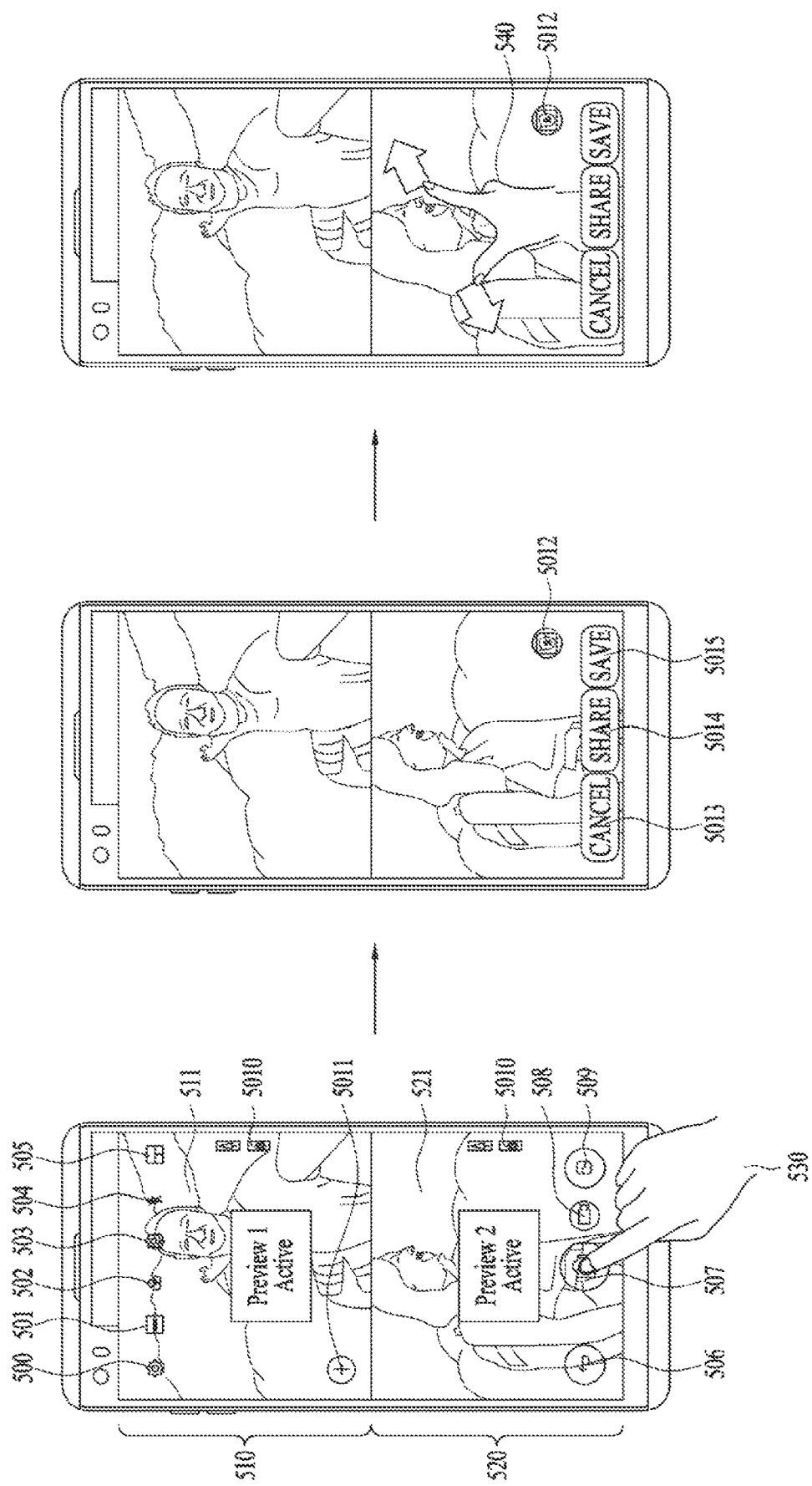
FIG. 5 is a diagram to describe one example of executing a simultaneous shot mode in a mobile terminal according to one embodiment of the present invention.

FIG. 5 is a diagram to describe one example of executing a simultaneous shot mode in a mobile terminal according to one embodiment of the present invention. In the following description of an embodiment with reference to FIG. 5, description redundant with the former description with reference to FIG. 4 shall be omitted.

Icon Outputted to Control Camera Application

According to one embodiment of the present invention, a mobile terminal may output, through a camera application, a setting icon 500, a mode change icon 501, a filter change icon 502, a simultaneous/sequential shot mode change icon 503, a flash adjust icon 504, a view mode change icon 505, a backward icon 506, a capture icon 507, a record icon 508, a gallery thumbnail icon 509, a view angle change icon 5010, and an image extract icon 5011.

Particularly, the setting icon 500 may correspond to an icon for changing settings of a camera application. The mode change icon 501 may correspond to an icon for changing a shot mode provided by a camera application. The filter change icon 502 may correspond to an icon for changing a shot filter provided by a camera application. The simultaneous/sequential shot mode change icon 503 shall be described in detail later. The flash adjust icon 504 may correspond to an icon for adjusting a flash into AUTO, ON or OFF for an image capture. The view mode change icon 505 may correspond to an icon for changing a view mode of a camera application. For example, a view mode of a camera application may include a simple mode, a normal mode, and a professional mode. The view angle change icon 5010 may correspond to an icon for changing a camera into a normal view angle mode or a wide angle mode. The image extract icon 5011 may correspond to an icon for extracting an image from a memory of a mobile terminal or an external environment. This shall be described in detail with reference to FIG. 11 later.

According to one embodiment of the present invention, the mobile terminal can output the simultaneous/sequential shot mode change icon 503 only in a state that a splice mode is executed through the mode change icon 501. Namely, in a state that is not the slice mode, the mobile terminal can output a front/rear camera change icon instead of the simultaneous/sequential shot mode change icon 503.

According to one embodiment of the present invention, the gallery thumbnail icon 509 may be outputted in a manner that a most recently captured thumbnail is outputted in form of an icon.

According to one embodiment of the present invention, the simultaneous/sequential shot mode change icon 503 may correspond to an icon for changing a simultaneous shot mode and a sequential shot mode. The simultaneous shot mode shall be described in the embodiments of FIG. 5 and FIG. 6, and the sequential shot mode shall be described in the embodiments of FIGS. 7 to 11.

Simultaneous Shot Mode

Referring to a first diagram of FIG. 5, a simultaneous shot mode may correspond to a mode for capturing an image in a state that currently shot preview images are simultaneously outputted to a first image region 510 and a second image region 520, respectively.

Particularly, a mobile terminal may launch a camera application. Hence, the mobile terminal may output the camera application to a display unit. According to one embodiment of the present invention, the mobile terminal can launch a splice mode through a camera application and execute a simultaneous shot mode in the splice mode. Moreover, although all the following embodiments are described as implemented on a camera or gallery application, they can be implemented on other applications capable of performing the equivalent functions as well.

According to one embodiment of the present invention, through a camera application on which a simultaneous shot mode is currently executed, a mobile terminal can output a first preview image 511 currently shot through a front camera to a first image region 510 and also output a second preview image 521 currently shot through a rear camera to a second image region 520.

According to another embodiment of the present invention, through a camera application on which a simultaneous shot mode is currently executed, a mobile terminal can output a second preview image 521 currently shot through a rear camera to a first image region 510 and also output a first preview image 511 currently shot through a front camera to a second image region 520.

According to one embodiment of the present invention, a preview image outputted from the first image region 510 may correspond to an image captured by a last selected camera in normal mode, and a preview image outputted from the second image region 520 may correspond to an image captured by an opposite camera of the preview image outputted from the first image 510.

For example, the mobile terminal can correspond to a state that a user ends the camera application after capturing the preview image through the front camera in normal mode. Thereafter, if the camera application is re-launched in the mobile terminal and the simultaneous shot mode is executed, the mobile terminal can output the first preview image 511 currently shot through the front camera to the first image region 510 and also output the second preview image 521 currently shot through the rear camera to the second image region 520.

Switching Between Front Camera and Rear Camera

Although not shown in the drawing, if sensing a first input signal for selecting the first or second preview image 511 or 521, the mobile terminal can switch the first preview image 511 and the second preview image 521 to each other.

For example, in a state that the first preview image 511 and the second preview image 521 are outputted to the first image region 510 and the second image region 520, respectively, the mobile terminal can sense an input signal applied by a user in a manner of touching the first preview image 511 and then flicking downward.

As the mobile terminal senses the flicking input signal, it is able to output the second preview image 521 and the first preview image 511 to the first image region 510 and the second image region 520, respectively. Here, it is a matter of course that a direction of the flicking input signal is non-limited.

Capturing Image

According to one embodiment of the present invention, while the first and second preview images 511 and 521 are outputted, the mobile terminal can sense a first input signal 530 for selecting the capture icon 507. Here, the first input signal 530 may correspond to various input signals for capturing the first and second preview images 511 and 521. For example, a user can directly touch the capture icon 507 and also input a signal for selecting the capture icon 507 to the mobile terminal through a preset voice recognition.

Referring to a second diagram of FIG. 5, as sensing the first input signal 530, the mobile terminal can capture the first and second preview images 511 and 521.

Stopping Outputting Image Extract icon

According to one embodiment of the present invention, if the first and second preview images 511 and 521 are captured, the mobile terminal can stop outputting the image extract icon 5011. Namely, since the first and second preview images 511 and 521 are already captured, it is unnecessary to extract an image.

Outputting Quick Share Icon

According to one embodiment of the present invention, if the first and second preview images 511 and 521 are captured, the mobile terminal can output a quick share icon 5012. Here, the quick share icon 5012 may correspond to an icon for quickly sharing a captured image. This shall be described in detail with reference to FIG. 13 later.

Outputting Cancel, Share and Save Icons

According to one embodiment of the present invention, if both of the first and second preview images 511 and 521 are captured, the mobile terminal can output a cancel icon 5013, a share icon 5014, and a save icon 5015.

Here, if the cancel icon 5013 is selected, the mobile terminal can perform a function of returning back by cancelling 'save' or 'share' of a captured image. If the share icon 5014 is selected, the mobile terminal can perform a function of sharing a captured image with another device or sever. If the save icon 5015 is selected, the mobile terminal can perform a function of saving a captured image to the mobile terminal. This shall be described in detail with reference to FIGS. 12 to 14 later.

Moving, Enlarging and Reducing Captured Preview Image

Referring to a third diagram of FIG. 5, the mobile terminal can sense a second input signal 540 for selecting the captured second preview image 521. Here, the second input signal 540 may correspond to a touch input signal applied in a manner of touching the second preview image 521 and then pinching out.

As the mobile terminal senses the second input signal 540, the mobile terminal can change at least one of a size and location of the outputted second preview image 521. Referring to the aforementioned example, if sensing a pinch-out touch input as the second input signal 540, the mobile terminal can control a size of the second preview image 521 to increase. Likewise, if the second input signal 540 is a pinch-in touch input, it is a matter of course that a size of the second preview image 521 can be controlled to decrease.

Moreover, although not shown in the drawing, the second input signal 540 may correspond to a touch input signal applied in a manner of touching the second preview image 521 and then dragging. In this case, as the second input signal 540 is sensed, the mobile terminal can move the location of the second preview image 521 on the basis of a direction for dragging the second preview image 521. For example, if a user touches and then drags the second preview image 521 upward as the second input signal 540, the mobile terminal can move the second preview image 521 upward as sensing the second input signal 540. Moreover, although not shown in the drawing, Moreover, although not shown in the drawing, if sensing a third input signal (not shown) for selecting the captured first preview image 511, it is a matter of course that the mobile terminal can control the first preview image 511.

Moreover, although the drawing shows that the second input signal 540 or the third input signal selects a captured preview image, it is a matter of course that the second input signal 540 or the third input signal can be sensed in a state that a shot is currently taken in the preview image region.

Figure 6:
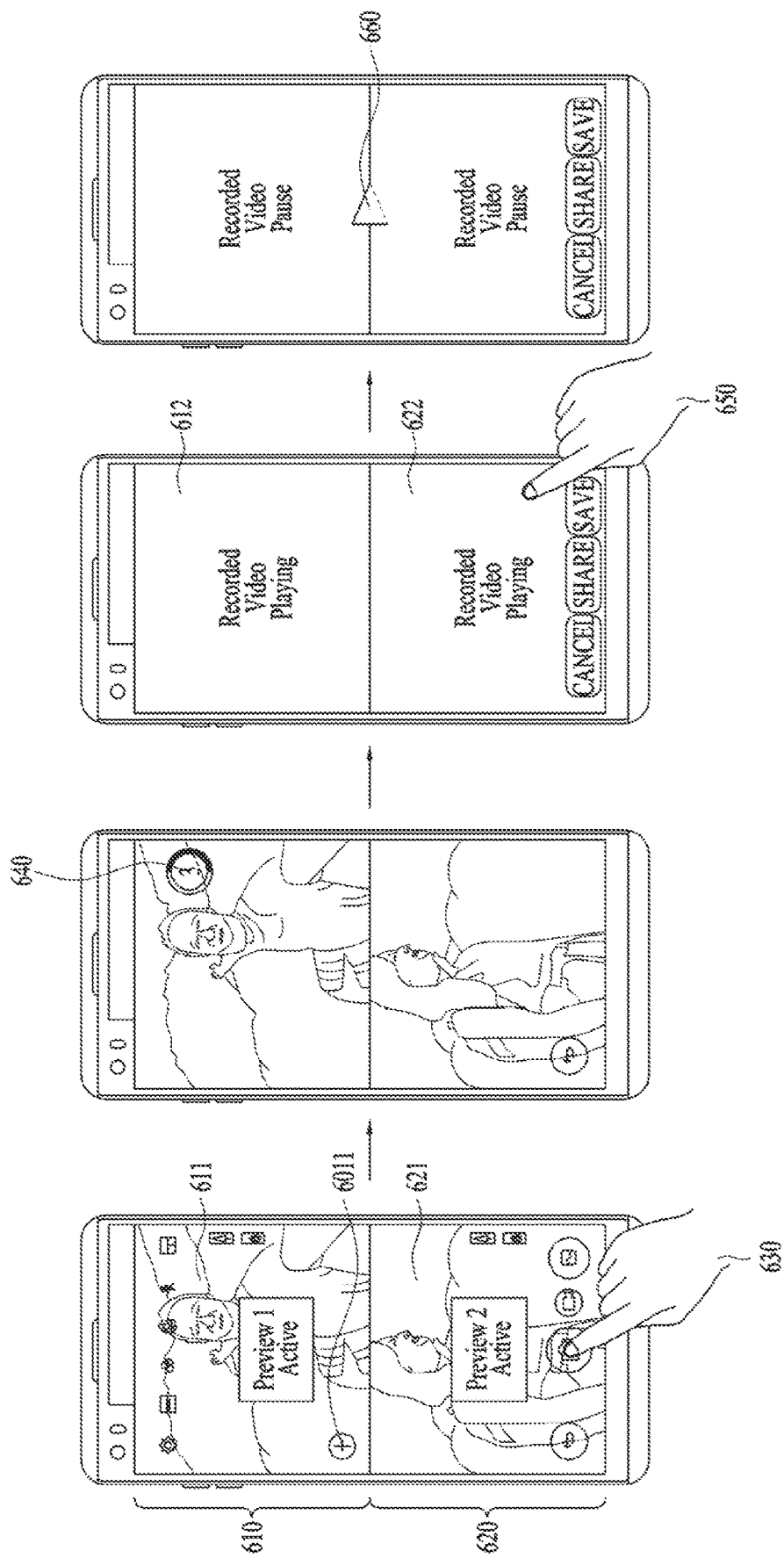
FIG. 6 is a diagram to describe another example of executing a simultaneous shot mode in a mobile terminal according to one embodiment of the present invention.

FIG. 6 is a diagram to describe another example of executing a simultaneous shot mode in a mobile terminal according to one embodiment of the present invention. In the following description of an embodiment with reference to FIG. 12, description redundant with the former description with reference to FIG. 11 shall be omitted.

Unlike the embodiment of FIG. 5, the embodiment of FIG. 6 relates to recording a video in simultaneous shot mode.

Referring to a first diagram of FIG. 6, through a camera application currently executing a simultaneous shot mode, a mobile terminal can output a first preview image 611 currently shot through a front camera to a first image region 610 and also output a second preview image 621 currently shot through a rear camera to a second image region 620.

According to one embodiment of the present invention, while the first and second preview images 611 and 621 are outputted, the mobile terminal can sense a first input signal 630 for selecting a record icon. For example, a user can touch the record icon with a preset pressure.

Referring to a second diagram of FIG. 6, as sensing the first input signal 630, the mobile terminal can record the first and second preview images 611 and 621.

According to one embodiment of the present invention, as sensing the first input signal 630, the mobile terminal can record the first and second preview images 611 and 621 during a preset time from a timing of sensing the first input signal 630. For example, the mobile terminal can record the first and second preview images 611 and 621 during 3 seconds from a timing of selecting the record icon.

According to another embodiment of the present invention, after sensing the first input signal 630, the mobile terminal can record the first and second preview images 611 and 621 until sensing a second input signal (not shown) for selecting the record icon again.

According to one embodiment of the present invention, while the first and second preview images 611 and 621 are recorded, the mobile terminal can output a record indicator 640 indicating that the first and second preview images 611 and 621 are being recorded.

Here, the record indicator 640 may indicate a preset time. For example, if the preset time is 3 seconds, the mobile terminal can output a remaining record time of the first and second preview images 611 and 621 in form of countdown through the record indicator 640.

According to one embodiment of the present invention, while the first and second preview images 611 and 621 are recorded, the mobile terminal can stop outputting a capture icon, a record icon and a gallery thumbnail icon. Namely, the mobile terminal can output a backward icon only while the first and second preview images 611 and 621 are recorded.

According to one embodiment of the present invention, if the recording of the first and second preview images 611 and 621 is completed, the mobile terminal can automatically play a recorded first video 612 and a recorded second video 622.

Referring to a third diagram of FIG. 6, while the first and second videos 612 and 622 are automatically played, the mobile terminal can sense a third input signal 650 for selecting the first or second video 612 or 622. Here, the third input signal 650 may correspond to a touch input signal applied in a manner of touching a random point of the currently played first or second video 612 or 622.

Referring to a fourth diagram of FIG. 6, as sensing the third input signal 650, the mobile terminal can stop playing the first and second videos 612 and 622. Moreover, in response to the third input signal 650, the mobile terminal may output a play indicator 660.

Although not shown in the drawing, as sensing an input signal for selecting the play indicator 660, the mobile terminal can play the first and second videos 612 and 622. In doing so, the mobile terminal may play the first and second videos 612 and 622 from the beginning or the stop timing.

Figure 7:
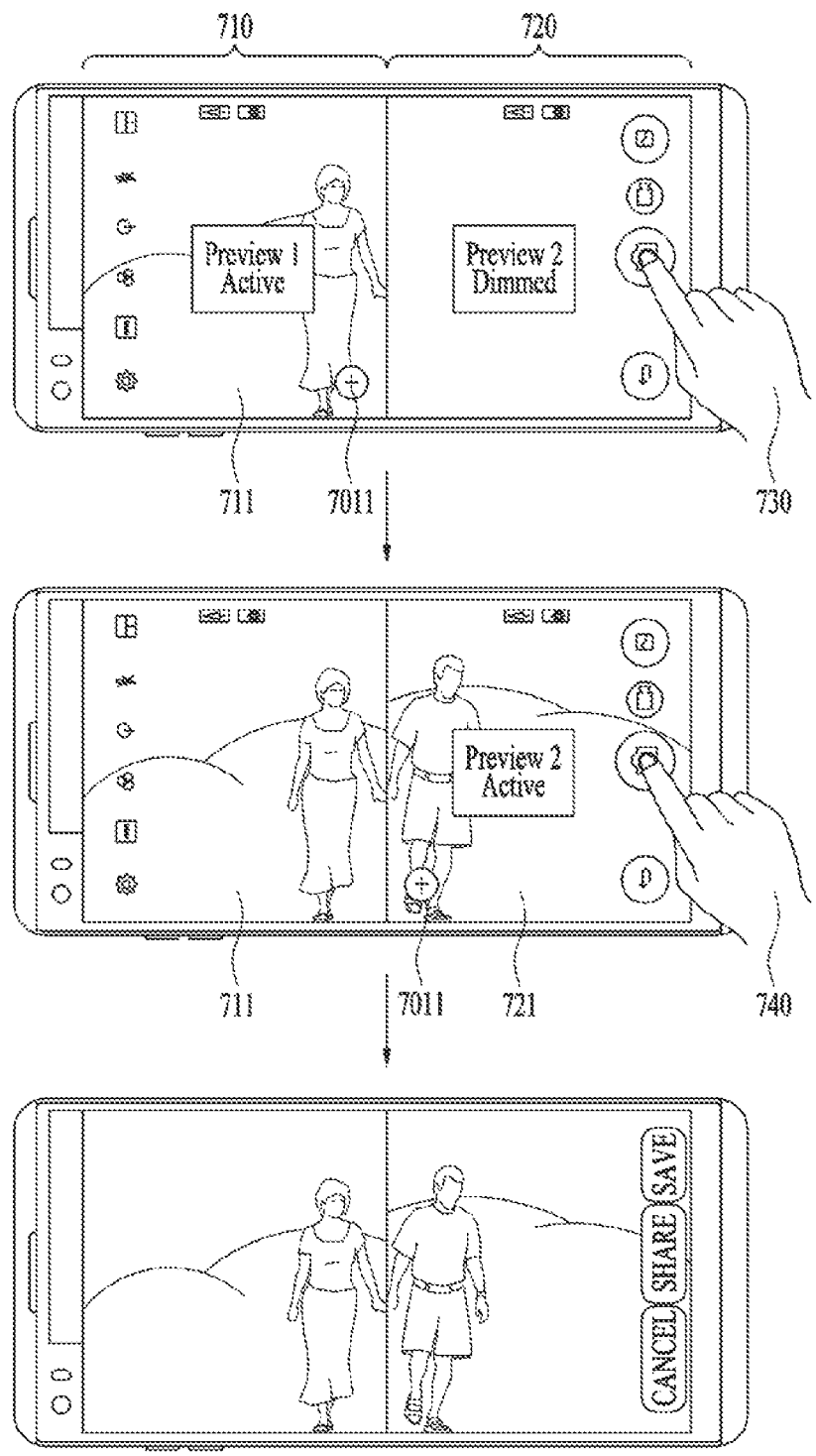
FIG. 7 is a diagram to describe one example of executing a sequential shot mode in a mobile terminal according to one embodiment of the present invention.

FIG. 7 is a diagram to describe one example of executing a sequential shot mode in a mobile terminal according to one embodiment of the present invention. In the following description of an embodiment with reference to FIG. 7, description redundant with the former description with reference to FIGS. 4 to 6 shall be omitted.

In the embodiments of FIG. 5 and FIG. 6, a mobile terminal can change a simultaneous shot mode into a sequential shot mode through a simultaneous/simultaneous shot mode change icon within a camera application.

Moreover, in the embodiments of FIG. 5 and FIG. 6, the mobile terminal outputs a preview image in vertical mode (e.g., portrait mode). Yet, in the embodiment of FIG. 7, the mobile terminal outputs a preview image in horizontal mode (e.g., landscape mode). In this case, a control icon outputted within a camera application can be automatically moved based on the landscape mode.

Referring to a first diagram of FIG. 7, a mobile terminal can execute a sequential shot mode through a camera application. Here, the sequential shot mode may correspond to a mode for sequentially capturing preview images currently shot in a first image region 710 and a second preview image region 720.

According to one embodiment of the present invention, the mobile terminal may correspond to a state that a first preview image 711 is outputted to the first image region 710. Namely, the mobile terminal may correspond to a state that the first image region 710 is active. In doing so, the mobile terminal may maintain the second image region 720 in inactive state. For example, the mobile terminal can output the second preview image 721 outputted to the second image region 720 in a manner of being dimmed.

According to one embodiment of the present invention, the mobile terminal can output an image extract icon 7011 to the active first image region 710. Here, the image extract icon may correspond to an icon for extracting an image from a memory of the terminal or an external environment. This shall be described in detail with reference to FIG. 11 later.

According to one embodiment of the present invention, the mobile terminal can sense a first input signal 730 for selecting a capture icon for capturing the first preview image 711.

Referring to a second diagram of FIG. 7, as the first input signal 730 is sensed, the mobile terminal can capture the first preview image 711 outputted to the first image region 710.

According to one embodiment of the present invention, as sensing the first input signal 730, the mobile terminal can change the inactive second image region 720 into an active state. As the second image region 720 is changed into the active state, the mobile terminal can output the second preview image 721 currently shot through a camera to the second image region 720. If the aforementioned example is described, the mobile terminal can clearly output the dimly outputted second preview image 721.

According to one embodiment of the present invention, the mobile terminal stops outputting the image extract icon 7011 outputted to the first image region 710 and outputs the image extract icon 7011 to the active second image region 720.

According to one embodiment of the present invention, the mobile terminal can sense a second input signal 740 for selecting a capture icon for capturing the second preview image 721.

Referring to a third diagram of FIG. 7, as sensing the second input signal, the mobile terminal can capture the second preview image 712 outputted to the second image region 720.

According to one embodiment of the present invention, if both of the first preview image 711 and the second preview image 721 are captured, the mobile terminal can output a cancel icon, a share icon and a save icon. Namely, the mobile terminal can capture both of the first preview image 711 and the second preview image 721 and then save or share them as a single image. This shall be described in detail with reference to FIGS. 12 to 14 later.

Figure 8:
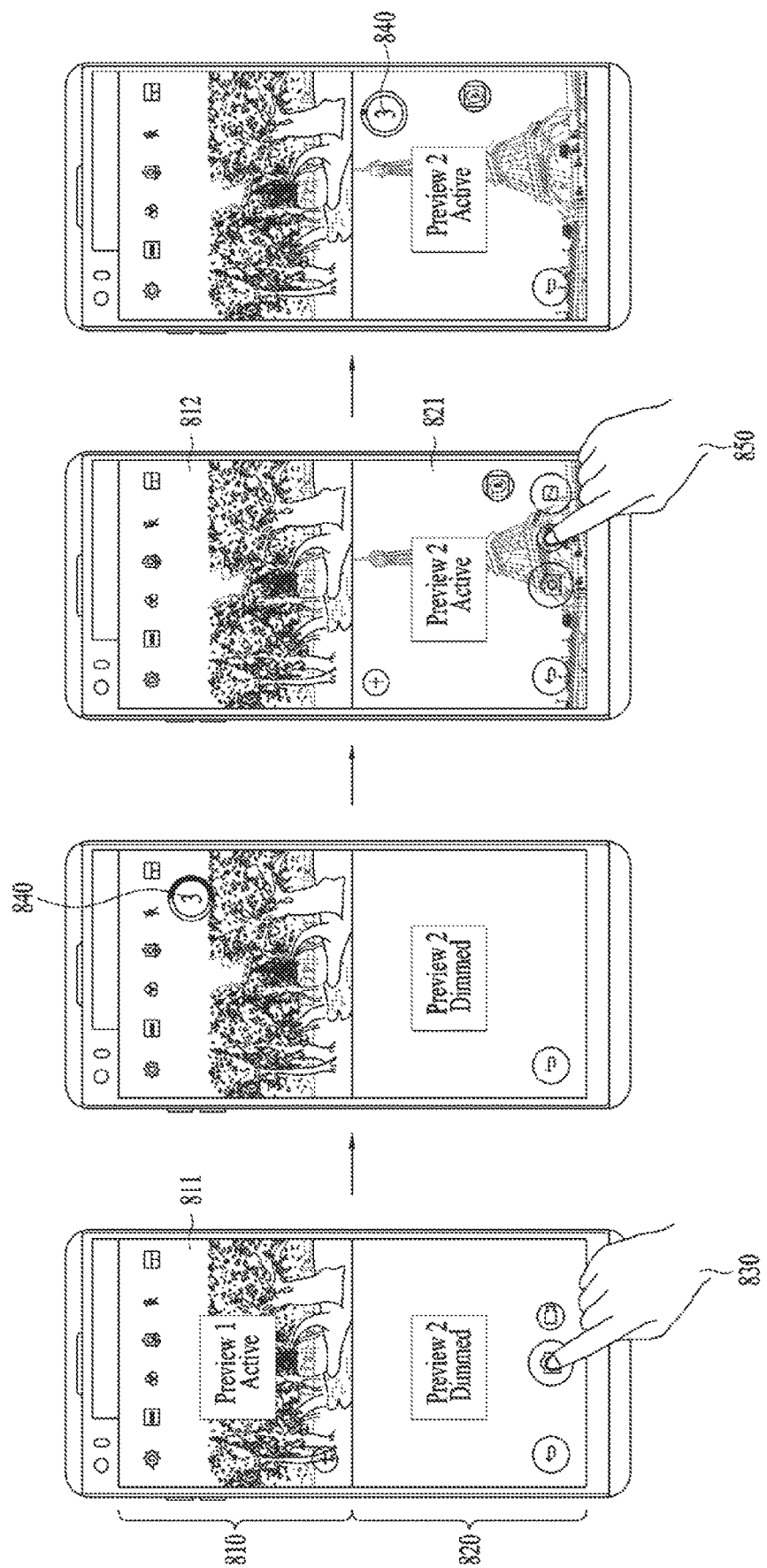
FIG. 8 is a diagram to describe another example of executing a sequential shot mode in a mobile terminal according to one embodiment of the present invention.

FIG. 8 is a diagram to describe another example of executing a sequential shot mode in a mobile terminal according to one embodiment of the present invention. In the following description of an embodiment with reference to FIG. 12, description redundant with the former description with reference to FIGS. 4 to 7 shall be omitted.

Referring to a first diagram of FIG. 8, through a camera application currently executing a sequential shot mode, a mobile terminal may correspond to a state that a first image region 810 and a second image region 811 are outputted. Namely, the mobile terminal may correspond to a state that the first image region is active. In doing so, the mobile terminal may maintain the second image region 820 in inactive state.

According to one embodiment of the present invention, while the first preview image 811 is outputted, the mobile terminal may sense a first input signal 830 for selecting a record icon.

Referring to a second diagram of FIG. 8, as sensing the first input signal 830, the mobile terminal can record the first preview image 811 for a preset time from a timing of sensing the first input signal 830. For example, the mobile terminal can record the first preview image 811 for 3 seconds from a timing of selecting the record icon.

According to one embodiment of the present invention, while the first preview image 811 is recorded, the mobile terminal can output a record indicator 840 indicating that the first preview image 811 is being recorded. Here, the record indicator 840 may indicate a preset time. For example, if the preset time is 3 seconds, the mobile terminal can output a remaining record time of the first preview image 811 through the record indicator 640.

According to one embodiment of the present invention, while the first preview image 811 is recorded, the mobile terminal can stop outputting a capture icon, a record icon and a gallery thumbnail icon but output a backward icon only.

Referring to a third diagram of FIG. 8, as the recoding of the first preview image 811 is completed, the mobile terminal can output a thumbnail of a recorded first video 812 to the first image region 810.

Particularly, the mobile terminal can record the first preview image for the preset time. Hence, if the preset time expires, the mobile terminal can stop the recording of the first preview image 811. And, the mobile terminal can output a thumbnail corresponding to one of a plurality of frames included in the recorded first video 812 to the first image region 810.

According to one embodiment of the present invention, as the recording of the first video 812 is completed, the mobile terminal can changes the second image region 820 into an active state. As the second image region 820 is changed into the active state, the mobile terminal can output the second preview image 821 currently shot through the camera to the second image region 820.

According to one embodiment of the present invention, while the second preview image 821 is outputted to the second image region 820, the mobile terminal can sense a second input signal 850 for selecting a record icon.

Referring to a fourth diagram of FIG. 8, as sensing the second input signal 850, the mobile terminal can record the second preview image 821 for a preset time from a timing of sensing the second input signal 850. Here, the preset time may include the time equal to or different from the time of recording the first preview image 811.

According to one embodiment of the present invention, while the second preview image 821 is recorded, the mobile terminal can output a record indicator 840 indicating that the second preview image 821 is being recorded.

Like the aforementioned embodiment, while the second preview image 821 is recorded, the mobile terminal can stop outputting a capture icon, a record icon and a gallery thumbnail icon but output a backward icon only.

Although not shown in the drawing, if the preset time expires, the mobile terminal may stop the recording of the second preview image 821.

According to one embodiment of the present invention, as the recoding of the second preview image 821 is completed, the mobile terminal can output a thumbnail of a recorded second video to the second image region 820.

Thereafter, after recording both of the first video 812 and the second video, the mobile terminal may save or share them as a single video. This shall be described in detail with reference to FIGS. 12 to 14 later.

Moreover, although the following embodiment is described with reference to an image, it is a matter of course that a video is applicable to all embodiments.

Figure 9:
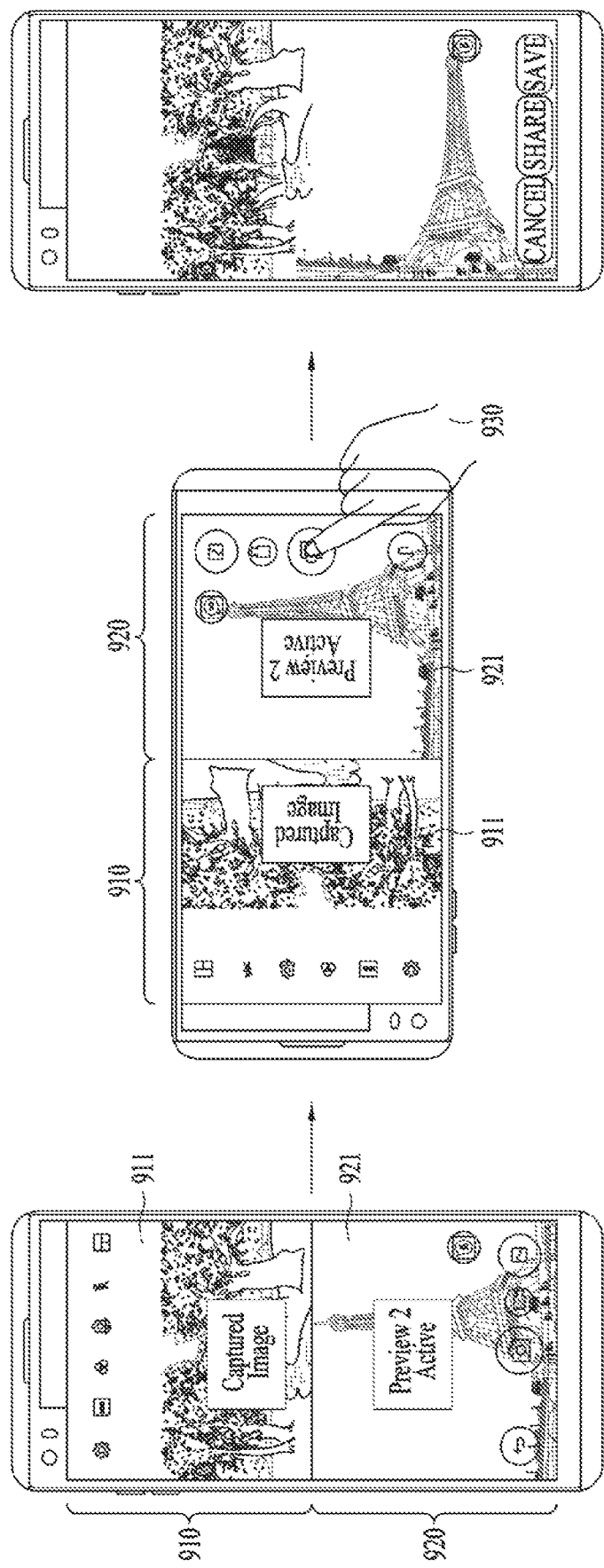
FIG. 9 is a diagram to describe another example of executing a sequential shot mode in a mobile terminal according to one embodiment of the present invention.

FIG. 9 is a diagram to describe another example of executing a sequential shot mode in a mobile terminal according to one embodiment of the present invention. In the following description of an embodiment with reference to FIG. 9, description redundant with the former description with reference to FIGS. 4 to 8 shall be omitted.

Referring to a first diagram of FIG. 9, a mobile terminal may correspond to a state that a first preview image 911 is captured in a first image region 910 and a state that a second preview image 921 is outputted to a second image region 920. Here, a subject contained in the first preview image 911 may correspond to a state of a first direction and a subject contained in the second preview image 921 may correspond to a state of a second direction. For example, a subject contained in the first preview image 911 may correspond to a state of a horizontal direction (i.e., landscape direction) and a subject contained in the second preview image 921 may correspond to a state of a vertical direction (i.e., portrait direction.

Referring to a second diagram of FIG. 9, while the first preview image 911 is captured in the first image region 910 and the second preview image 921 is outputted to the second image region 920, the mobile terminal can sense a rotation of the mobile terminal.

Particularly, the mobile terminal can sense a rotation of the mobile terminal through a gyroscopic sensor provided to the mobile terminal or the like. For example, a user can rotate the mobile terminal from a vertical mode (e.g., portrait mode) to a horizontal mode (e.g., landscape mode).

If sensing the rotation of the mobile terminal, the mobile terminal can control the first preview image 911 captured in the first image region 910 not to be automatically rotated.

For example, since the first preview image 911 is already captured, as the mobile terminal is rotated from the vertical mode to the horizontal mode, a direction of a subject contained in the first preview image may be turned from the horizontal direction to the vertical direction.

According to one embodiment of the present invention, since the second image region 920 outputted by the mobile terminal intactly outputs an image outputted through a camera, although the mobile terminal is rotated, the second preview image 921 outputted to the second image region 920 can maintain an unrotated state.

Considering the aforementioned example, if the mobile terminal is rotated in the horizontal mode, a subject contained in the second preview image 921 outputted to the second image region 920 can maintain the vertical direction.

Namely, in case of the present invention, in completing a new image by merging the first preview image 911 and the second preview image 921, a user may intend to create an image containing a subject having various directions. Hence, although the mobile terminal is rotated, the first preview image 911 included in the first preview region 910 may be controlled not to be rotated.

Thus, if sensing a first signal 930 for capturing the second preview image 921, the mobile terminal may intactly capture the second preview image 921 in the state that the subject is in the vertical direction and then output the captured image to the second image region 920.

After capturing the second preview image 921, if the mobile terminal is rotated into the vertical mode, like a third diagram of FIG. 9, the subject contained in the second preview image 921 outputted from the second image region 920 may correspond to a state of the horizontal direction.

Figure 10:
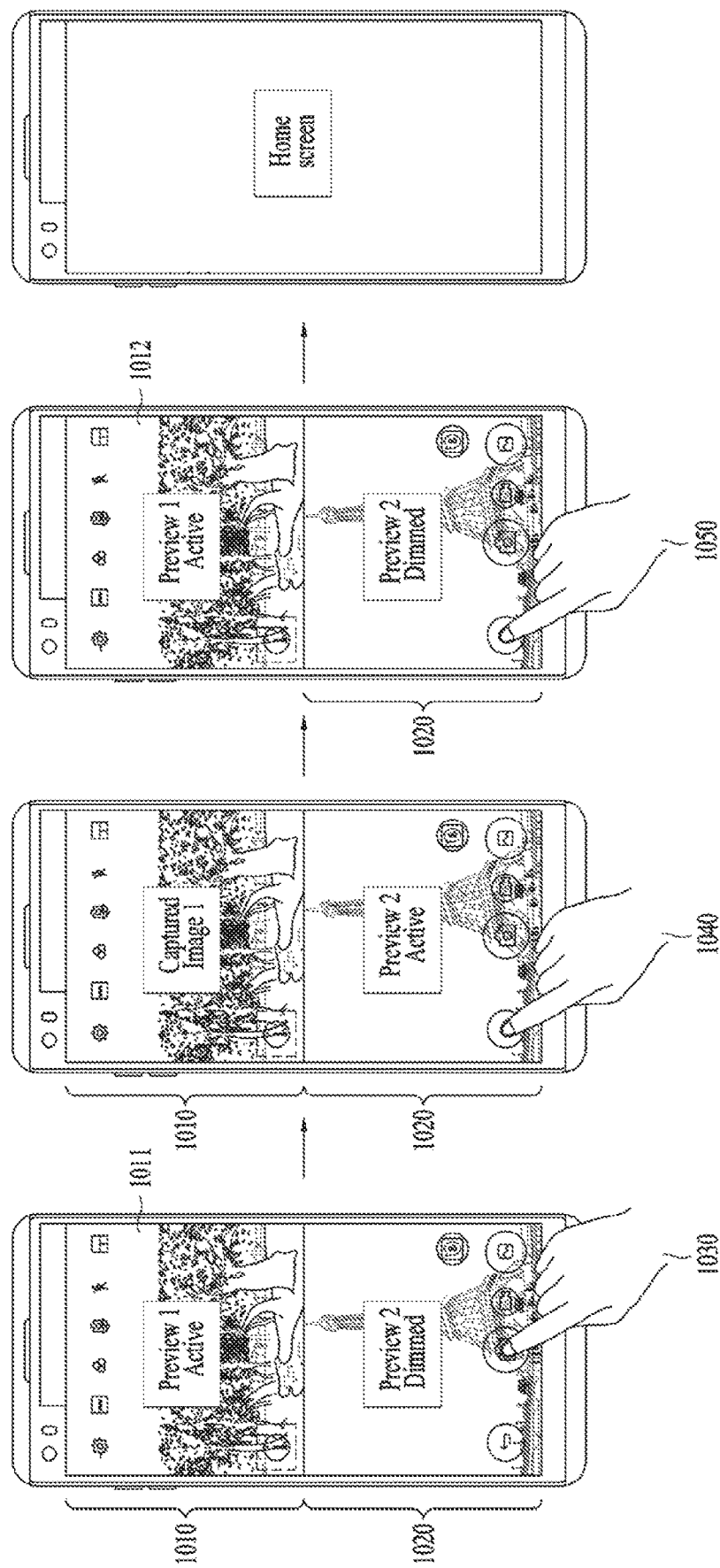
FIG. 10 is a diagram to describe another example of executing a sequential shot mode in a mobile terminal according to one embodiment of the present invention.

FIG. 10 is a diagram to describe another example of executing a sequential shot mode in a mobile terminal according to one embodiment of the present invention. In the following description of an embodiment with reference to FIG. 10, description redundant with the former description with reference to FIGS. 4 to 9 shall be omitted.

Referring to a first diagram of FIG. 10, a mobile terminal can execute a sequential shot mode through a camera application.

According to one embodiment of the present invention, the mobile terminal can output a first preview image 1011 currently shot through a camera to a first image region 1010 and deactivate a second image region 1020.

According to one embodiment of the present invention, the mobile terminal can sense a first input signal 1030 for selecting a capture icon for capturing the first preview image 1011.

Referring to a second diagram of FIG. 10, as sensing the first input signal 1030, the mobile terminal can capture the first pre view image 1011 outputted to the first image region 1010.

According to one embodiment of the present invention, as sensing the first input signal 1030, the mobile terminal can changes the deactivated second image region 1020 into an active state.

According to one embodiment of the present invention, while the first preview image 1011 is outputted to the first image region 1010 and the second image region 1020 is active, the mobile terminal can sense a second input signal 1040 for selecting a backward icon.

Referring to a third diagram of FIG. 10, as sensing the second input signal 1040, the mobile terminal may delete the first preview image 1011 outputted to the first image region 1010 and output the second preview image 1012 currently shot through the camera.

According to one embodiment of the present invention, as sensing the second input signal 1040, the mobile terminal can change the second image region 1020 into an inactive state. Namely, as sensing the second input signal 1040 for selecting the backward icon, the mobile terminal can return to the embodiment of the first diagram of FIG. 10.

According to one embodiment of the present invention, while the second preview image 1012 is outputted to the first image region 1010 and the second image region 1020 is inactive, the mobile terminal may sense a third input signal 1050 for selecting the backward icon.

Referring to a fourth diagram of FIG. 10, as sensing the third input signal 1050, the mobile terminal can end the execution of the splice mode while maintaining the launched camera application. Namely, as sensing the third input signal 1050, the mobile terminal can end the slice mode and launch the camera application in normal mode.

According to one embodiment of the present invention, as sensing the third input signal 1050, the mobile terminal can end the launched camera application. As the camera application is ended, the mobile terminal can launch another application currently run in the background.

According to another embodiment of the present invention, as sensing the third input signal 1050, the mobile terminal can end the launched camera application and output a home screen to a display unit. In case that the camera application is launched in the mobile terminal, the mobile terminal may end the launched camera application and output the home screen.

Figure 11:
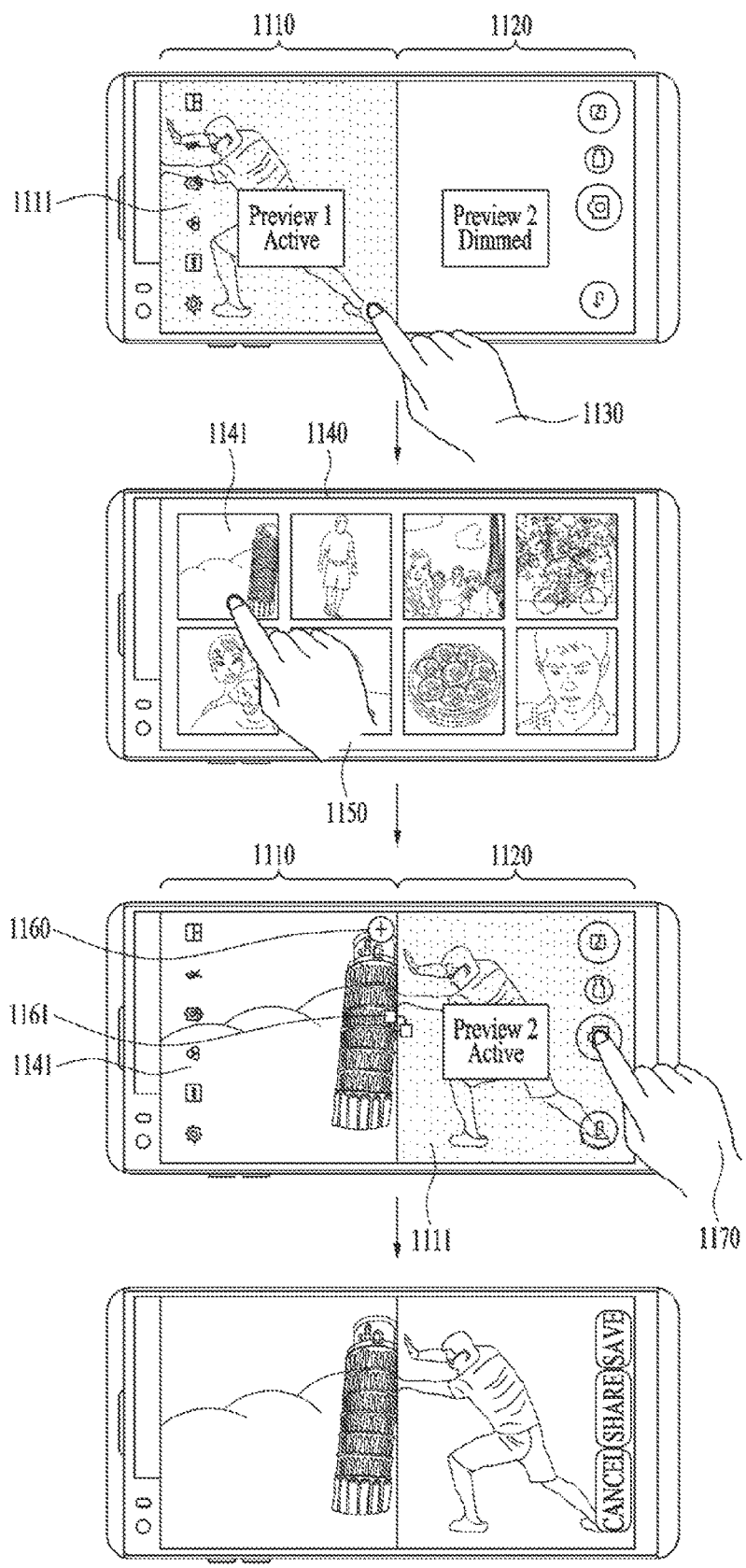
FIG. 11 is a diagram to describe further example of executing a sequential shot mode in a mobile terminal according to one embodiment of the present invention.

FIG. 11 is a diagram to describe further example of executing a sequential shot mode in a mobile terminal according to one embodiment of the present invention. In the following description of an embodiment with reference to FIG. 11, description redundant with the former description with reference to FIGS. 4 to 10 shall be omitted.

Referring to a first diagram of FIG. 11, a mobile terminal can execute a sequential shot mode through a camera application.

According to one embodiment of the present invention, the mobile terminal can activate a first image region 1110 and deactivate a second image region 1120. The mobile terminal can output a first preview image currently shot through a camera to the first image region 1110.

According to one embodiment of the present invention, the mobile terminal can sense a first input signal 1130 for selecting an image extract icon outputted to the first image region 1110.

Referring to a second diagram of FIG. 11, as sensing the first input signal 1130, the mobile terminal can output a gallery application 1140 to a display unit. Here, the gallery application 1140 may correspond to an application for outputting an image stored in the mobile terminal or an external memory.

According to one embodiment of the present invention, as sensing the first input signal 1130, the mobile terminal can extract an image from an external device or server through a wireless communication unit.

According to one embodiment of the present invention, the mobile terminal can sense a second input signal 1150 for selecting a first image 1141 outputted through the gallery application 1140.

Moreover, as sensing the second input signal 1150, the mobile terminal may output a screen for editing the first image 1141 [not shown in the drawing]. Particularly, through the screen for editing the first image 1141, the mobile terminal may crop, pan, enlarge, reduce, or rotate the first image 1141.

Referring to a third diagram of FIG. 11, as sensing the second input signal, the mobile terminal may output the first image 1141 to the first image region 1110.

Moreover, after outputting the first image 1141 to the first image region 1110, the mobile terminal may pan, enlarge or reduce the first image 1141 in response to an input signal for selecting the first image 1141 [not shown in the drawing].

According to one embodiment of the present invention, as sensing the second input signal 1150, the mobile terminal can change the second image region 1120 into an active state. As the second image region 1120 is changed into the active state, the mobile terminal may output the first preview image 1111 currently shot through the camera to the second image region 1120.

According to one embodiment of the present invention, as the first image 1141 is outputted to the first region 1110, the mobile terminal can output a rotate icon 1160 to the first image region 1110.

Here, the rotate icon 1160 may correspond to an icon for rotating the first image 1141 by 90 degrees counterclockwise. For example, while the first image 1141 is outputted, if a user selects the rotate icon 1160 twice, the mobile terminal can rotate the outputted first image 1141 by 180 degrees counterclockwise.

According to one embodiment of the present invention, while the first image 1141 is outputted to the first image region 1110 and the first preview image 1111 is outputted to the second image region 1120, the mobile terminal can output an image swap icon 1161 to a space between the first image 1141 and the first preview image 1111.

Here, the image swap icon 1161 may correspond to an icon for swapping the first image 1141 outputted to the first image region 1110 for the first preview image 1111 outputted to the second image region 1120. For example, if a user selects the image swap icon 1161, the mobile terminal can output the first preview image 1111 and the first image 1141 to the first image region 1110 and the second image region 1120, respectively.

According to one embodiment of the present invention, the mobile terminal may sense a third input signal 1170 for capturing the first preview image 1111 currently outputted to the second image region 1120.

Referring to a fourth diagram of FIG. 11, as sensing the third input signal 1170, the mobile terminal may capture the first preview image 1111 currently outputted to the second image region 1120.

According to one embodiment of the present invention, as sensing the third input signal 1170, the mobile terminal may output the first image 1141 to the first image region 1110 and capture to output the first preview image 1111 to the second image region 112.

Therefore, the mobile terminal can save or share the first image 1141 and the first preview image 1111 as a single image by splicing the first image 1141 and the first preview image 1111 together.

Figure 12:
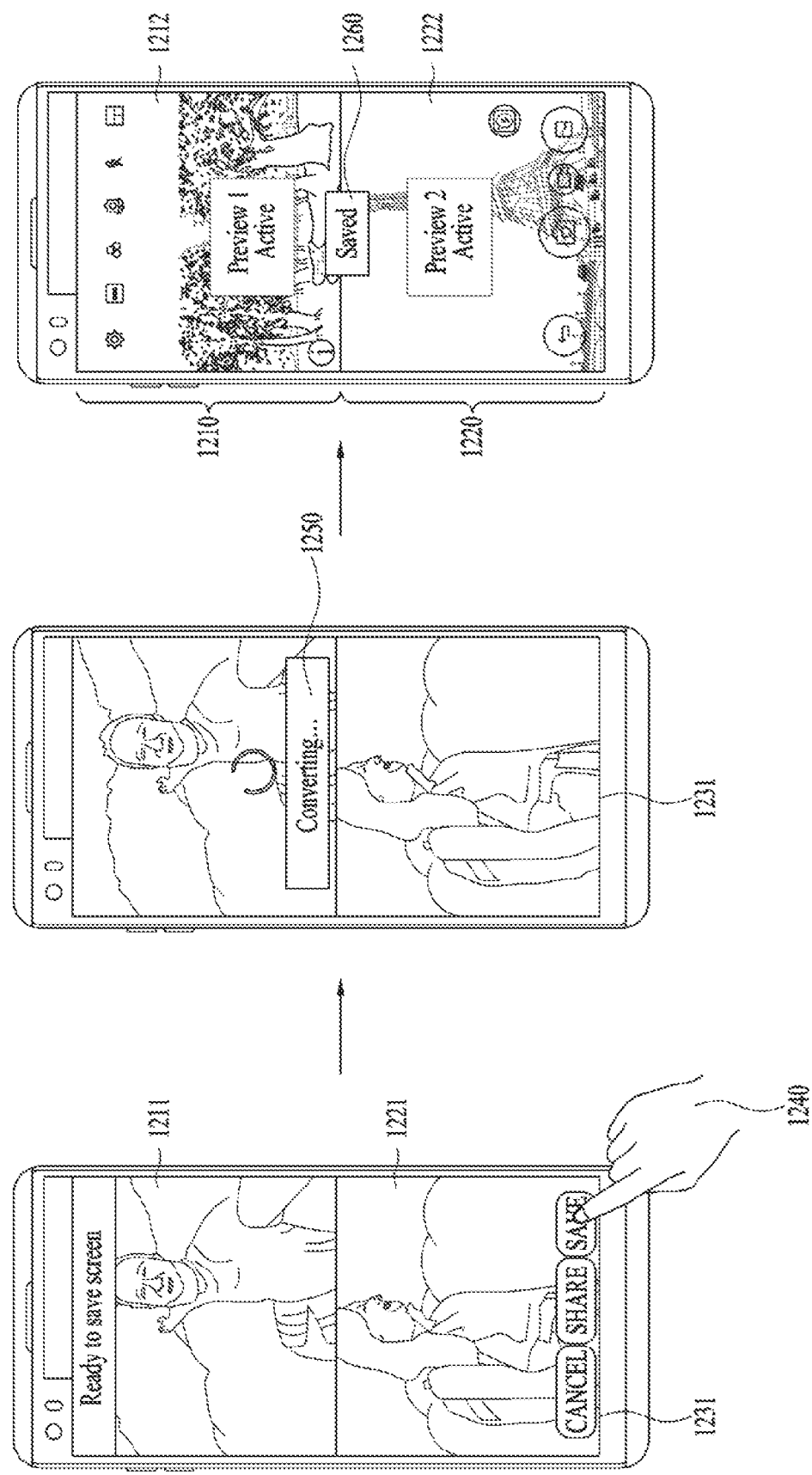
FIG. 12 is a diagram to describe one example of saving a shot image in a mobile terminal according to one embodiment of the present invention.

FIG. 12 is a diagram to describe one example of saving a shot image in a mobile terminal according to one embodiment of the present invention. In the following description of an embodiment with reference to FIG. 12, description redundant with the former description with reference to FIGS. 4 to 11 shall be omitted.

A first diagram of FIG. 12 shows a complete image from the aforementioned embodiment. Particularly, a mobile terminal executes a splice mode on a camera application and is able to complete a single image by splicing two images together through a simultaneous or sequential shot mode. For example, the mobile terminal can output a coupled image 1231 resulting from splicing a first image 1211 and a second image 1221 together through the camera application.

According to one embodiment of the present invention, while the coupled image 1231 is outputted, the mobile terminal can sense a first input signal (not shown) for selecting at least one of the first image 1211, the second image 1221 and the coupled image 1231. Here, as described in the third diagram of FIG. 5, the first input signal may correspond to an input signal for controlling a previously captured image. For example, as sensing the first input signal, the mobile terminal can pan, rotate, enlarge or reduce at least one of the first image 1211, the second image 1221 and the coupled image 1231.

According to one embodiment of the present invention, if the coupled image 1231 is outputted, the mobile terminal may output an icon for controlling a complete coupled image 1231 to the camera application. Here, the icon for controlling the coupled image 1231 may include a cancel icon, a share icon and a save icon.

According to one embodiment of the present invention, while the coupled image 1231 is outputted, the mobile terminal can sense a first input signal 1240 for selecting the save icon to save at least one of the first image 1211, the second image 1221 and the coupled image 1231. In the following description, an embodiment that the first input signal 1240 selects the save icon to save the coupled image 1231 is taken as an example.

Referring to a second diagram of FIG. 12, as sensing the first input signal 1240, the mobile terminal can output a progress popup 1250 onto the coupled image 1231. Here, the progress popup 1250 may correspond to a popup indicating that the first image 1211 and the second image 1221 are spliced together to be saved.

Referring to a third diagram of FIG. 12, as sensing the first input signal 1240, the mobile terminal can save the coupled image 1231.

According to one embodiment of the present invention, as the coupled image 1231 is completely saved, the mobile terminal can return to the previous mode of the camera application.

For example, the mobile terminal may correspond to a state of executing the splice mode on the camera application and then completing the coupled image 1231 through the simultaneous shot mode. As the saving of the coupled image 1231 is completed, the mobile terminal can execute the simultaneous mode through the camera application.

Namely, the mobile terminal executes the simultaneous shot mode of the camera application, thereby outputting the currently shot first and second preview images 1212 and 1222 to the first and second image regions 1210 and 1220, respectively.

According to one embodiment of the present invention, as the saving of the coupled image 1231 is completed, the mobile terminal may output a save popup 1260.

Thus, a user can save the previous coupled image 1231 and then shoot a new image.

Figure 13:
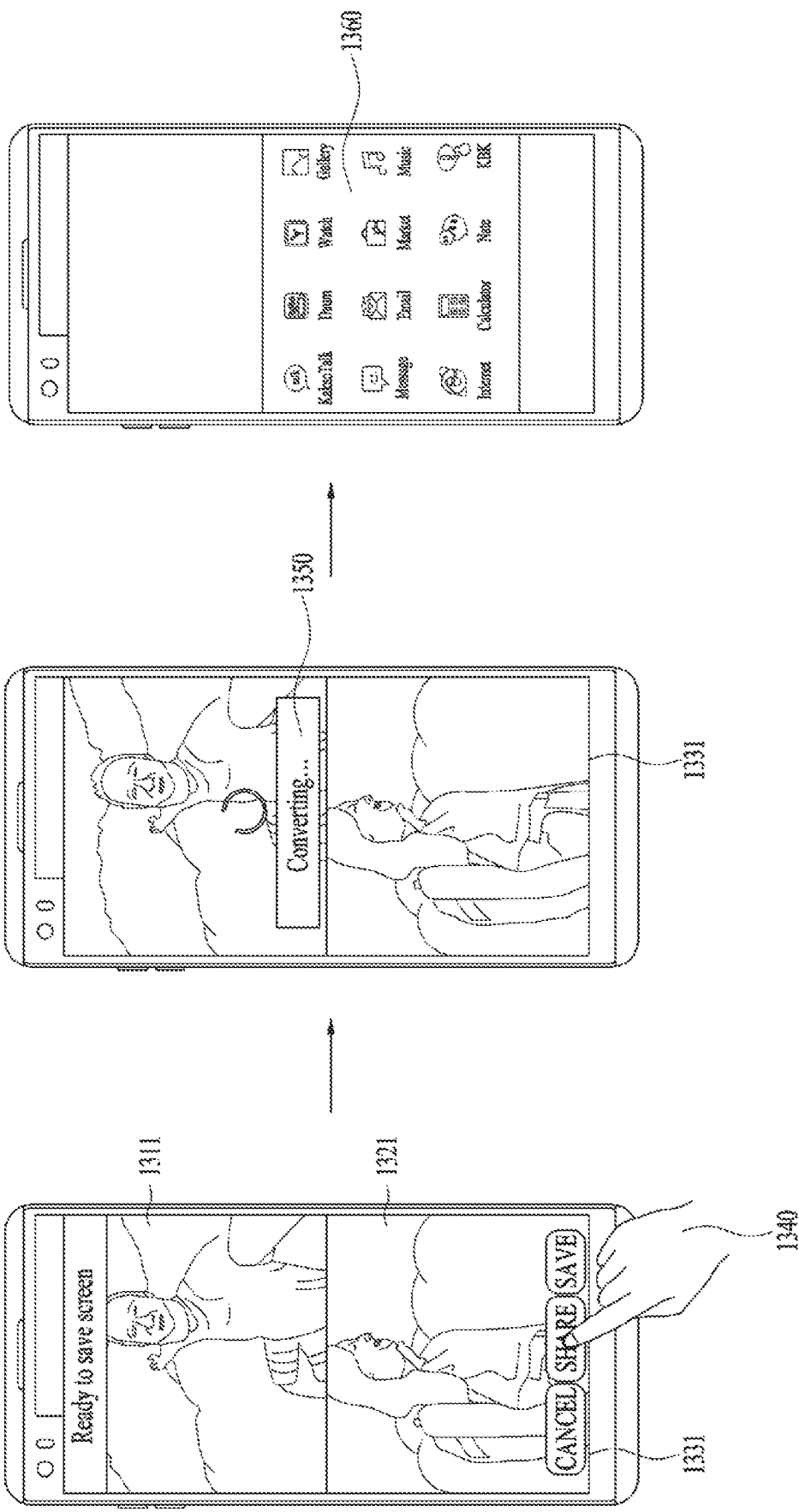
FIG. 13 is a diagram to describe one example of sharing a shot image in a mobile terminal according to one embodiment of the present invention.

FIG. 13 is a diagram to describe one example of sharing a shot image in a mobile terminal according to one embodiment of the present invention. In the following description of an embodiment with reference to FIG. 13, description redundant with the former description with reference to FIGS. 4 to 12 shall be omitted.

A first diagram of FIG. 13 corresponds to the first diagram of FIG. 12. Namely, a mobile terminal executes a splice mode on a camera application and is able to complete a single image by splicing two images together through a simultaneous or sequential shot mode. For example, the mobile terminal can output a coupled image 1331 resulting from splicing a first image 1311 and a second image 1321 together through the camera application.

According to one embodiment of the present invention, if the coupled image 1331 is outputted, the mobile terminal can output an icon for controlling the completed coupled image 1331 to the camera application. Here, the icon for controlling the coupled image 1331 may include a cancel icon, a share icon and a save icon.

According to one embodiment of the present invention, while the coupled image 1331 is outputted, the mobile terminal may sense a first input signal 1340 for selecting the share icon for sharing at least one of the first image 1311, the second image 1321 and the coupled image 1331.

Referring to a second diagram of FIG. 13, as sensing the first input signal 1340, the mobile terminal can output a progress popup 1350 onto the coupled image 1331. Here, the progress popup 1350 may correspond to a popup indicating that the first image 1311 and the second image 1321 are spliced together to be shared.

Referring to a third diagram of FIG. 13, as sensing the first input signal 1340, the mobile terminal can save the coupled image 1331.

According to one embodiment of the present invention, as sensing the first input signal 1340, the mobile terminal can output a share target list 1360 to a display unit. Moreover, although not shown in the drawing, in response to an input signal for selecting a share target contained in the share target list 1360, the mobile terminal can share the coupled image 1331 with the selected share target. In doing so, the mobile terminal can share the coupled image 1331 with an external device or server through a wireless communication unit.

Figure 14:
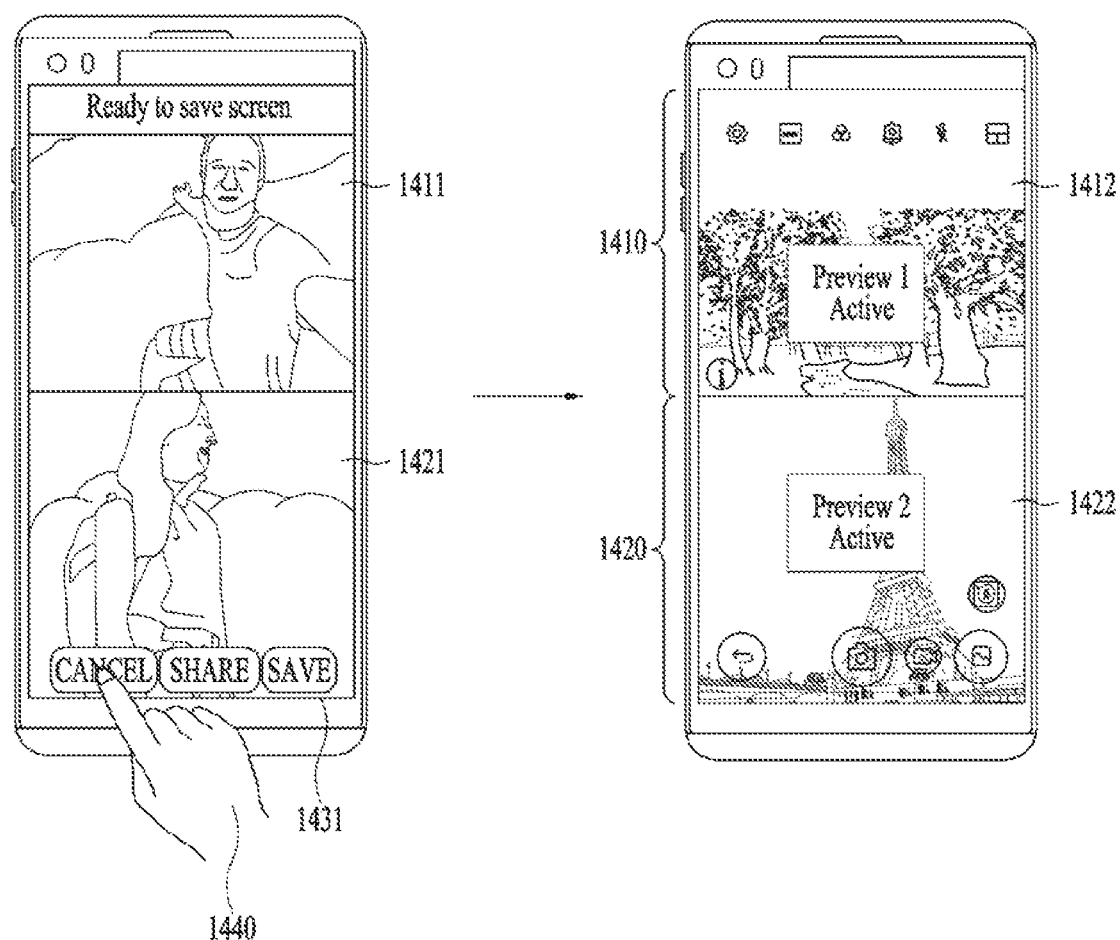
FIG. 14 is a diagram to describe one example of returning to a previous camera mode in a mobile terminal according to one embodiment of the present invention.

FIG. 14 is a diagram to describe one example of returning to a previous camera mode in a mobile terminal according to one embodiment of the present invention. In the following description of an embodiment with reference to FIG. 14, description redundant with the former description with reference to FIGS. 4 to 13 shall be omitted.

A first diagram of FIG. 14 corresponds to the first diagram of FIG. 13. Namely, a mobile terminal executes a splice mode on a camera application and is able to complete a single image by splicing two images together through a simultaneous or sequential shot mode. For example, the mobile terminal can output a coupled image 1431 resulting from splicing a first image 1411 and a second image 1421 together through the camera application.

According to one embodiment of the present invention, if the coupled image 1431 is outputted, the mobile terminal can output an icon for controlling the completed coupled image 1431 to the camera application. Here, the icon for controlling the coupled image 1431 may include a cancel icon, a share icon and a save icon.

According to one embodiment of the present invention, while the coupled image 1431 is outputted, the mobile terminal may sense a first input signal 1440 for selecting the cancel icon.

Referring to a second diagram of FIG. 14, as sensing the first input signal 1440, the mobile terminal can return to a previous mode of the camera application without saving or sharing an outputted photo.

For example, if the previous mode of the camera application corresponds to a simultaneous shot mode from a splice mode, as the first input signal 1440 is sensed, the mobile terminal can output a first preview image 1412 currently shot through a front camera and a second preview image 1422 currently shot through a rear camera to a first image region 1410 and a second image region 1420, respectively.

Figure 15:
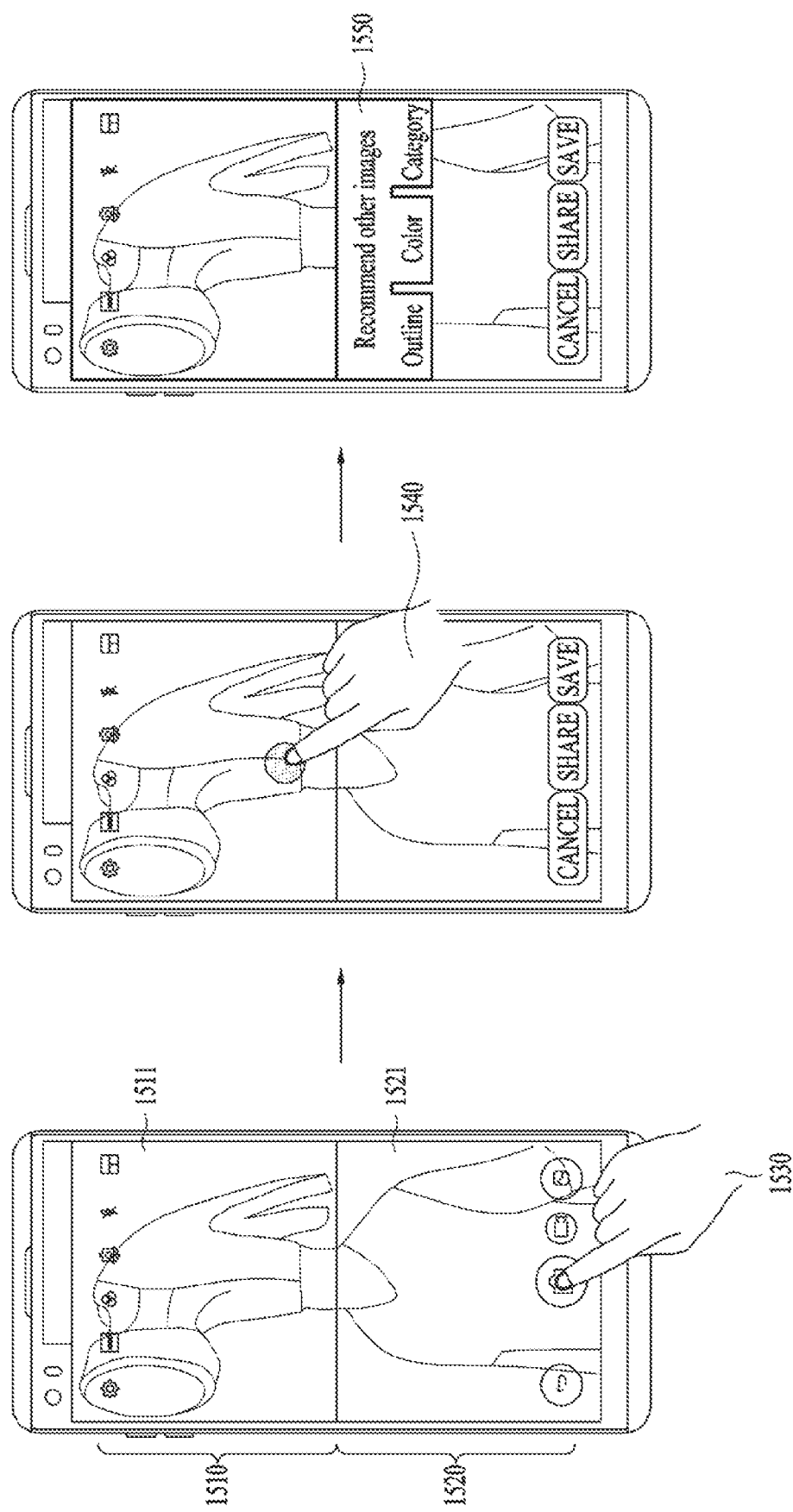
FIG. 15 is a diagram to describe one example of executing a splice mode in a mobile terminal according to one embodiment of the present invention.

FIG. 15 is a diagram to describe one example of executing a splice mode in a mobile terminal according to one embodiment of the present invention. In the following description of an embodiment with reference to FIG. 15, description redundant with the former description with reference to FIGS. 4 to 14 shall be omitted.

Referring to a first diagram of FIG. 15, a mobile terminal launches a camera application and is able to execute a splice mode on the camera application. Here, the splice mode may correspond to a mode for outputting a splice region 1510 and a preview image region 1520 to a display unit by partition the display unit.

According to one embodiment of the present invention, the mobile terminal can output a first preview image 1521 currently shot through a camera and a first splice image 1511 recommended on the basis of the first preview image 1521 to the preview image region 1520 and the splice region 1510, respectively.

Particularly, the mobile terminal can recommend the splice image 1511 based on at least one of an outline, color and category of the first preview image 1521. This shall be described in detail with reference to FIGS. 14 to 22 later.

According to one embodiment of the present invention, the mobile terminal can obtain the splice image 1511 through a memory provided inside or outside the mobile terminal. For example, the mobile terminal can obtain an image saved to a gallery application. And, the mobile terminal can obtain the splice image 1511 from a web browser, an SNS, an external server and the like through a wireless communication unit.

According to one embodiment of the present invention, while the first splice image 1511 and the first preview image 1521 are outputted, the mobile terminal can receive a first input signal 1530 for selecting a capture icon for capturing the first preview image 1521.

Referring to a second diagram of FIG. 15, as sensing the first input signal 1530, the mobile terminal can capture and output the first preview image 1521 to the preview image region 1520. In doing so, as described above, if the first preview image 1521 is captured, the mobile terminal outputs an icon for controlling a coupled image resulting from splicing the first splice image 1511 and the first preview image 1521 together.

According to one embodiment of the present invention, while the first splice image 1511 and the first preview image 1521 are outputted, the mobile terminal can sense a second input signal 1540 for selecting the first splice image 1511 or the first preview image 1521. Here, the second input signal 1540 may correspond to a preset touch input signal for selecting an image to change. For example, if intending to change the recommended first splice image 1511, a user can touch the first splice image 1511 over a preset time.

Referring to a third diagram of FIG. 15, as sensing the second input signal 1540, the mobile terminal can output a change reference popup 1550 to the selected image. Here, the change reference popup 1550 may correspond to a popup including a reference for changing an outputted image. For example, the change reference popup may include an outline, a color, a category and the like. This shall be described in detail with reference to FIGS. 16 to 22 later.

According to one embodiment of the present invention, as sensing the second input signal 1540, the mobile terminal can highlight to display a selected image. For example, if a user intends to change the first splice image 1511 by long touching the first splice image 1511, the mobile terminal can highlight to display the first splice image 1511.

Figure 16:
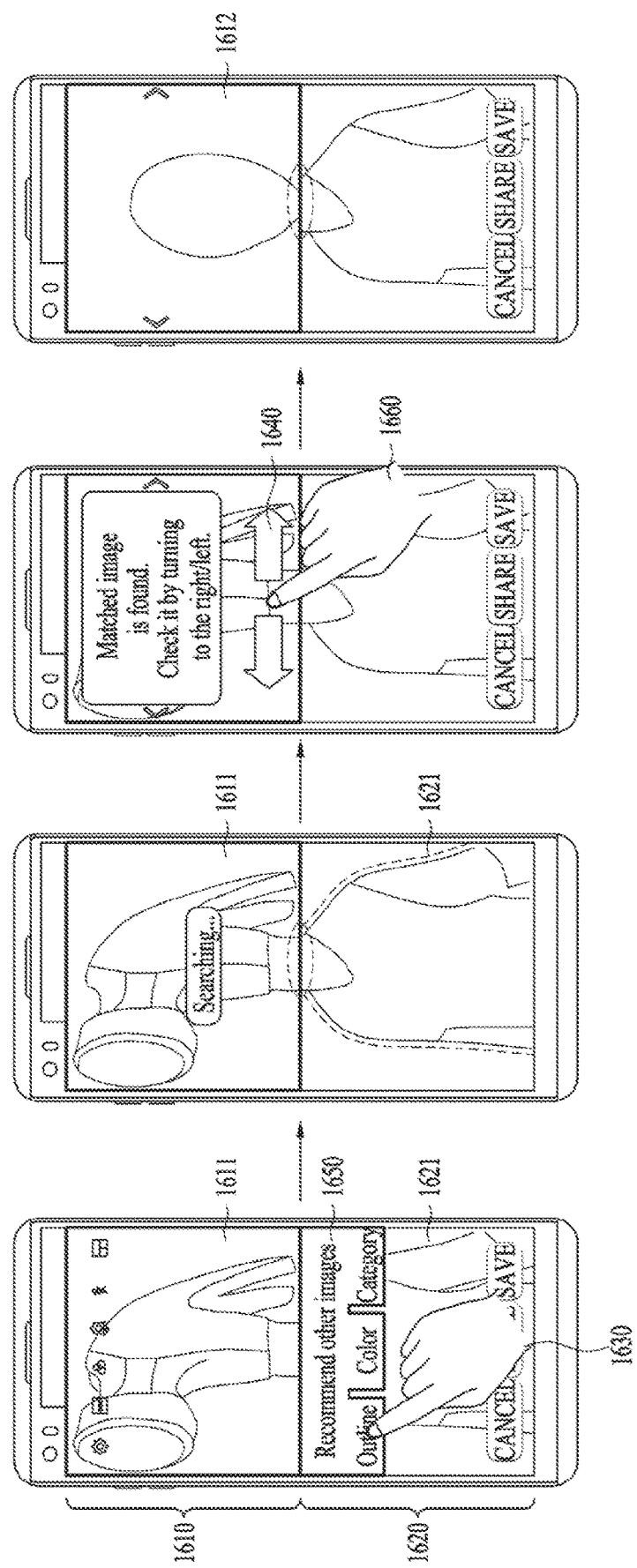
FIG. 16 is a diagram to describe one example of executing a splice mode on the basis of an outline in a mobile terminal according to one embodiment of the present invention.

FIG. 16 is a diagram to describe one example of executing a splice mode on the basis of an outline in a mobile terminal according to one embodiment of the present invention. In the following description of an embodiment with reference to FIG. 16, description redundant with the former description with reference to FIGS. 4 to 15 shall be omitted.

A first diagram of FIG. 16 corresponds to the third diagram of FIG. 15. Namely, the mobile terminal can correspond to a state that a first splice image 1611 outputted to a splice region 1610 is selected. Moreover, while the first splice image 1611 is selected, the mobile terminal can output a change reference popup 1650.

According to one embodiment of the present invention, the mobile terminal can sense a first input signal 1630 for selecting 'outline' from the change reference included in the change reference popup 1650.

Referring to a second diagram of FIG. 16, as sensing the first input single 1630, the mobile terminal can determine outlines of the first splice image 1611 and a first preview image 1621.

Particularly, the mobile terminal can determine an outline of a contact spot between the first splice image 1611 and the first preview image 1621. Here, the mobile terminal analyzes an outline of a subject by separately recognizing a subject and background contained in each of the first splice image 1611 and the first preview image 1621 and is then able to calculate a size of a cut face.

According to one embodiment of the present invention, the mobile terminal can output the determined outline as a dotted line onto at least one of the first splice image 1611 and the first preview image 1621.

According to one embodiment of the present invention, the mobile terminal can search other splice images that can be spliced to the first preview image 1621 based on the determined outline. In doing so, the mobile terminal can search other splice images, which can be spliced to the first preview image 1621, through a gallery application, an external server and the like.

According to one embodiment of the present invention, since the first splice image 1611 is changed in response to the first input signal 1630, the mobile terminal can stop outputting a control icon for controlling at least one of the first splice image 1611, the first preview image 1621 and a coupled image.

Referring to a third diagram of FIG. 16, if finding a second splice image 1612 that can be spliced to the first preview image 1621, the mobile terminal can output a guide indicator 1640 onto the first splice image 1611. Here, the second splice image 1612 may correspond to an image containing a subject having an outline that can be spliced to the first preview image 1621.

According to one embodiment of the present invention, the mobile terminal can sense a second input signal 1660 for selecting the first splice image 1611 in a preset direction based on the guide indicator 1640. For example, a user can touch the first splice image 1611 and then drag it to the left.

Referring to a fourth diagram of FIG. 16, as sensing the second input signal 1660, the mobile terminal can output the second splice image 1612 to the splice region 1610.

According to one embodiment of the present invention, as outputting the second splice image 1612, the mobile terminal can output an icon for controlling a coupled image resulting from splicing the first splice image 1612 and the first preview image 1621 together.

Figure 17:
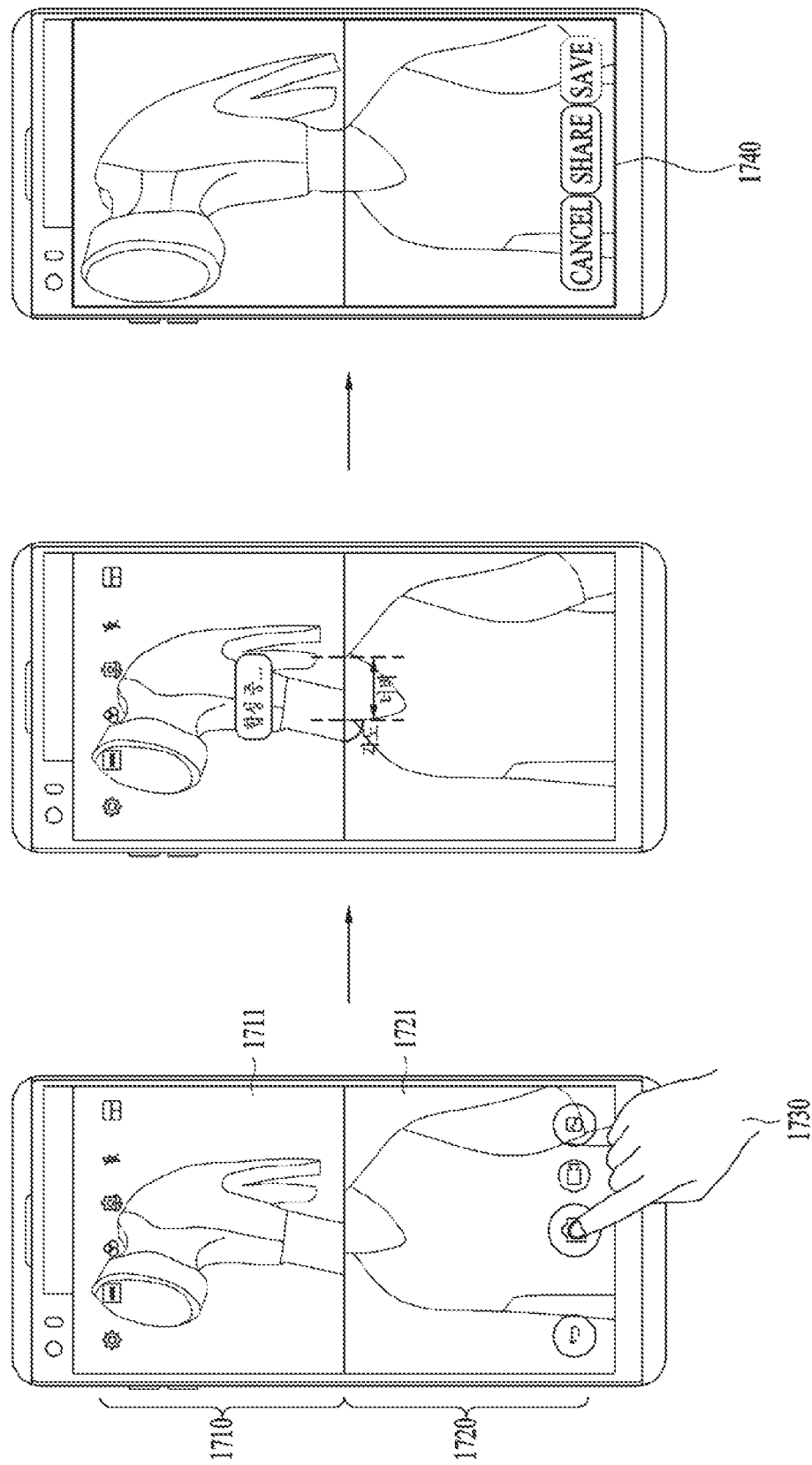
FIG. 17 is a diagram to describe another example of executing a splice mode on the basis of an outline in a mobile terminal according to one embodiment of the present invention.

FIG. 17 is a diagram to describe another example of executing a splice mode on the basis of an outline in a mobile terminal according to one embodiment of the present invention. In the following description of an embodiment with reference to FIG. 17, description redundant with the former description with reference to FIGS. 4 to 16 shall be omitted.

Referring to a first diagram of FIG. 17, a mobile terminal may correspond to a state that a splice image 1711 and a preview image 1721 currently shot through a camera are outputted to a spice region 1710 and a preview image region 1720, respectively.

According to one embodiment of the present invention, the mobile terminal can sense a first input signal 1730 for selecting a capture icon for capturing the preview image 1721.

Referring to a second diagram of FIG. 17, as sensing the first input signal 1730, the mobile terminal can recognize a width and angle of a section on which subjects contained in the splice image 1711 and the preview image 1721 meet. As sensing the first input signal 1730, the mobile terminal can extract outlines of subjects contained in the splice image 1711 and the preview image 1721. In the embodiment of the second diagram of FIG. 17, the subjects contained in the splice image 1711 and the preview image 1721 are in a state of failing to meet precisely.

According to one embodiment of the present invention, in order to match up the sections on which the subjects contained in the splice image 1711 and the preview image 1721 meet, the mobile terminal can automatically pan, rotate, enlarge or reduce the splice image 1711. Moreover, based on the outlines of the subjects contained in the splice image 1711 and the preview image 1721, the mobile terminal can automatically pan, rotate, enlarge or reduce the splice image 1711.

According to one embodiment of the present invention, based on a user's input, the mobile terminal can pan, rotate, enlarge or reduce the splice image 1711 or the preview image 1721.

Referring to a third diagram of FIG. 17, by panning, rotating, enlarging or reducing the splice image 1711 or the preview image 1721, the mobile terminal can correct to match up the sections of the subjects contained in the splice image 1711 and the preview image 1721.

According to one embodiment of the present invention, if the sections of the subjects contained in the splice image 1711 and the preview image 1721 are matched up within a preset error range, the mobile terminal can create a coupled image 1740 resulting from splicing the slice image 1711 and the preview image 1721 together.

Thereafter, as creating the coupled image 1740, the mobile terminal can output an icon for controlling the coupled image 1740.

Figure 18:
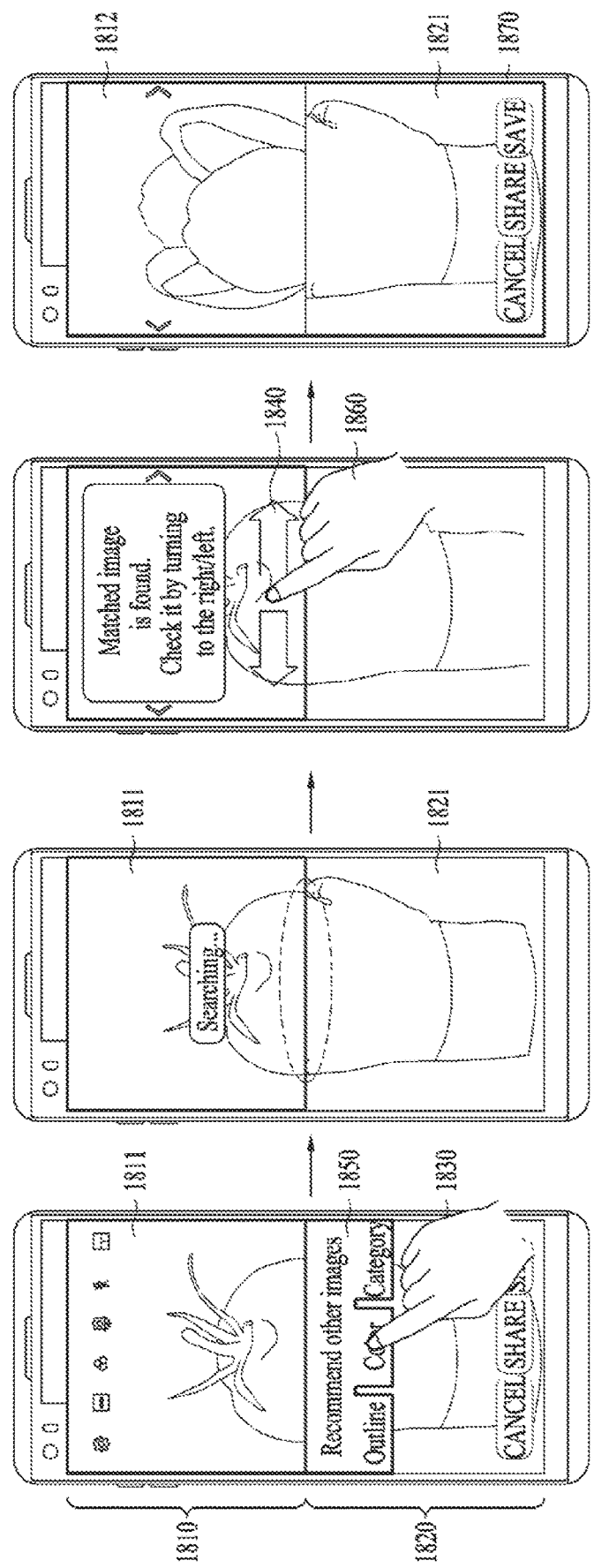
FIG. 18 is a diagram to describe one example of executing a splice mode on the basis of a color in a mobile terminal according to one embodiment of the present invention.

FIG. 18 is a diagram to describe one example of executing a splice mode on the basis of a color in a mobile terminal according to one embodiment of the present invention. In the following description of an embodiment with reference to FIG. 18, description redundant with the former description with reference to FIGS. 4 to 17 shall be omitted.

A first diagram of FIG. 18 corresponds to the first diagram of FIG. 16. Namely, while a first splice image 1811 outputted to a splice region 1810 is selected, a mobile terminal can output a change reference popup 1850.

According to one embodiment of the present invention, the mobile terminal can sense a first input signal 1830 for selecting 'color' from the change reference included in the change reference popup 1850.

Referring to a second diagram of FIG. 18, as sensing the first input single 1830, the mobile terminal can determine the color of a subject contained in the first splice image 1811.

According to one embodiment of the present invention, the mobile terminal can determine a color of a section on which the first splice image 1811 and the first preview image 1821 meet. The mobile terminal may search other splice images that can be spliced to the first preview image 1821 based on the determined color.

Referring to a third diagram of FIG. 18, if finding a second splice image 1812 that can be spliced to the first preview image 1821, the mobile terminal can output a guide indicator 1840 onto the first splice image 1811. Here, the second splice image 1812 may correspond to an image, of which portion meeting the first preview image 1821 has a similar color.

According to one embodiment of the present invention, the mobile terminal can sense a second input signal 1860 for selecting the first splice image 1811 in a preset direction based on the guide indicator 1840.

Referring to a fourth diagram of FIG. 18, as sensing the second input signal 1860, the mobile terminal can output the second splice image 1812 to the splice region 1810.

According to one embodiment of the present invention, the mobile terminal can create a coupled image 1870 resulting from splicing the first splice image 1812 and the first preview image 1821 together. Thereafter, as creating the coupled image 1870, the mobile terminal can output an icon for controlling the coupled image 1870.

Figure 19:
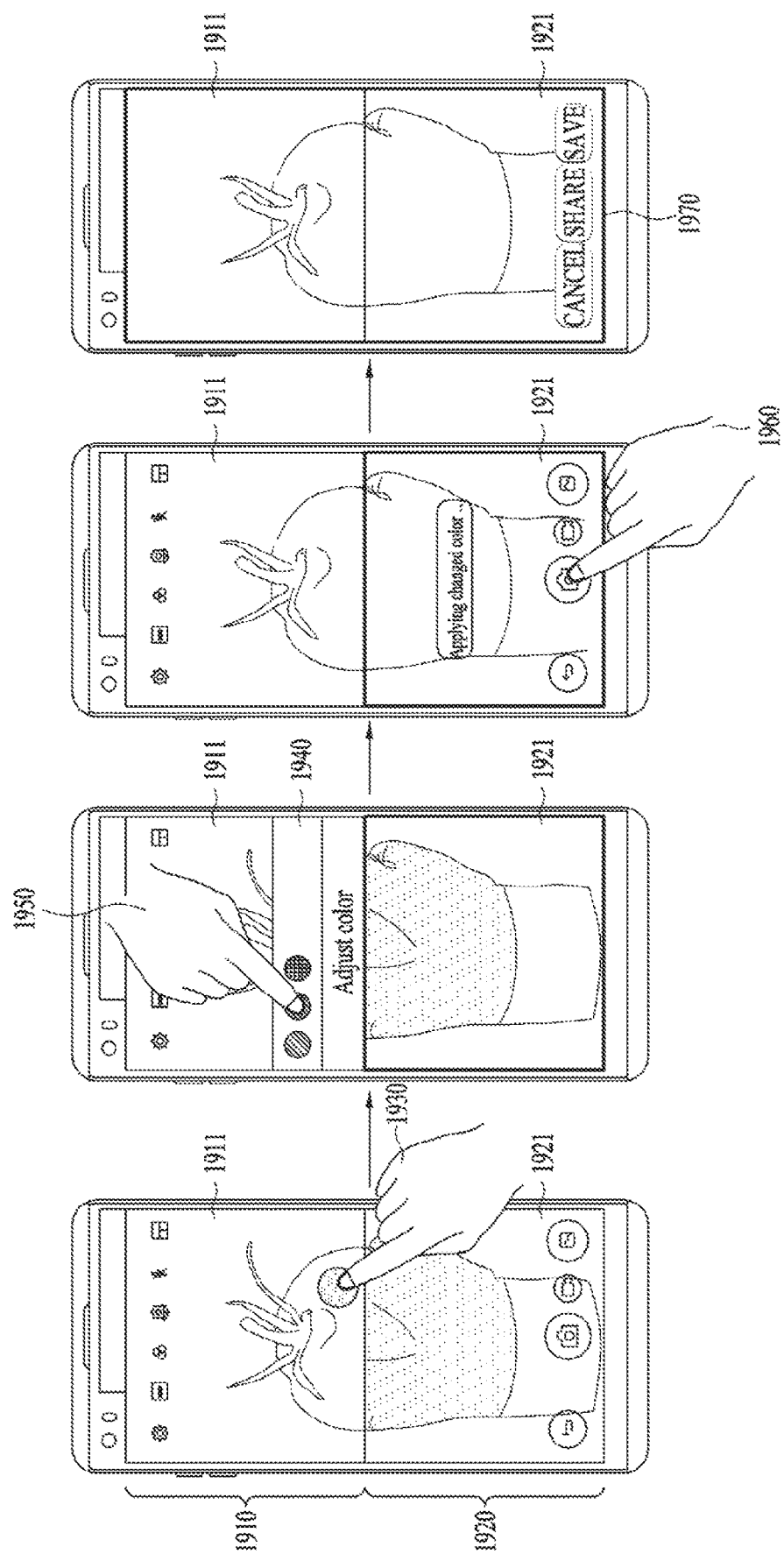
FIG. 19 is a diagram to describe another example of executing a splice mode on the basis of a color in a mobile terminal according to one embodiment of the present invention.

FIG. 19 is a diagram to describe another example of executing a splice mode on the basis of a color in a mobile terminal according to one embodiment of the present invention. In the following description of an embodiment with reference to FIG. 19, description redundant with the former description with reference to FIGS. 4 to 18 shall be omitted.

Referring to a first diagram of FIG. 19, a mobile terminal can execute a splice mode through a camera application. The mobile terminal can output a splice region 1910 and a preview image region 1920 to a display unit by partitioning. And, the mobile terminal can output a splice image and a preview image 1921 currently shot through a camera to the splice region 1910 and the preview image region 1920, respectively.

According to one embodiment of the present invention, the mobile terminal can sense a first input signal 1930 for selecting the splice image 1911. Here, the first input signal 1930 may correspond to an input signal of touching the splice image 1911 in a preset manner. For example, a user can apply a long press touch to the splice image 1911.

Referring to a second diagram of FIG. 19, as sensing the first input signal 1930, the mobile terminal can output a color list 1940. Here, the color list 1940 may correspond to a list on which colors included in the selected splice image 1911 are extracted and listed. For example, the splice image 1911 may include orange, black and green.

Here, the color list 1940 may correspond to a list on which colors included in the selected splice image 1911 are extracted and listed in order of a higher use rate. Particularly, the color list 1940 may include all colors included in a subject or background contained in the splice image 1911.

According to one embodiment of the present invention, as sensing the first input signal 1930, the mobile terminal can highlight to display the preview image 1921. Namely, as sensing the first input signal 1930, the mobile terminal can highlight to display the preview image 1921 in order to indicate that the color extracted from the splice image 1911 is applicable to the preview image 1921.

According to one embodiment of the present invention, the mobile terminal can sense a second input signal 1950 for selecting a first color included in the color list 1940. For example, the first color may correspond to orange.

Referring to a third diagram of FIG. 19, as sensing the second input signal 1950, the mobile terminal can change a color of a subject of the preview image 1921, which meets a subject corresponding to the first color of the splice image 1911 into the first color. The aforementioned example can be described as follows. First of all, the color of the subject of the preview image 1921 can be changed into orange.

According to one embodiment of the present invention, while the color of the subject contained in the preview image is changed into the first color, the mobile terminal can sense a third input signal 1960 for capturing the preview image 1921.

Referring to a fourth diagram of FIG. 19, as sensing the third input signal 1960, the mobile terminal can create a coupled image 1970 resulting from splicing the splice image 1911 and the preview image 1921 containing the subject, of which color is changed into the first color, together.

Namely, the mobile terminal changes the color of the subject of the preview image 1921 using the color included in the splice image 1911, thereby naturally coupling the splice image 1911 and the preview image 1921 with each other.

Figure 20:
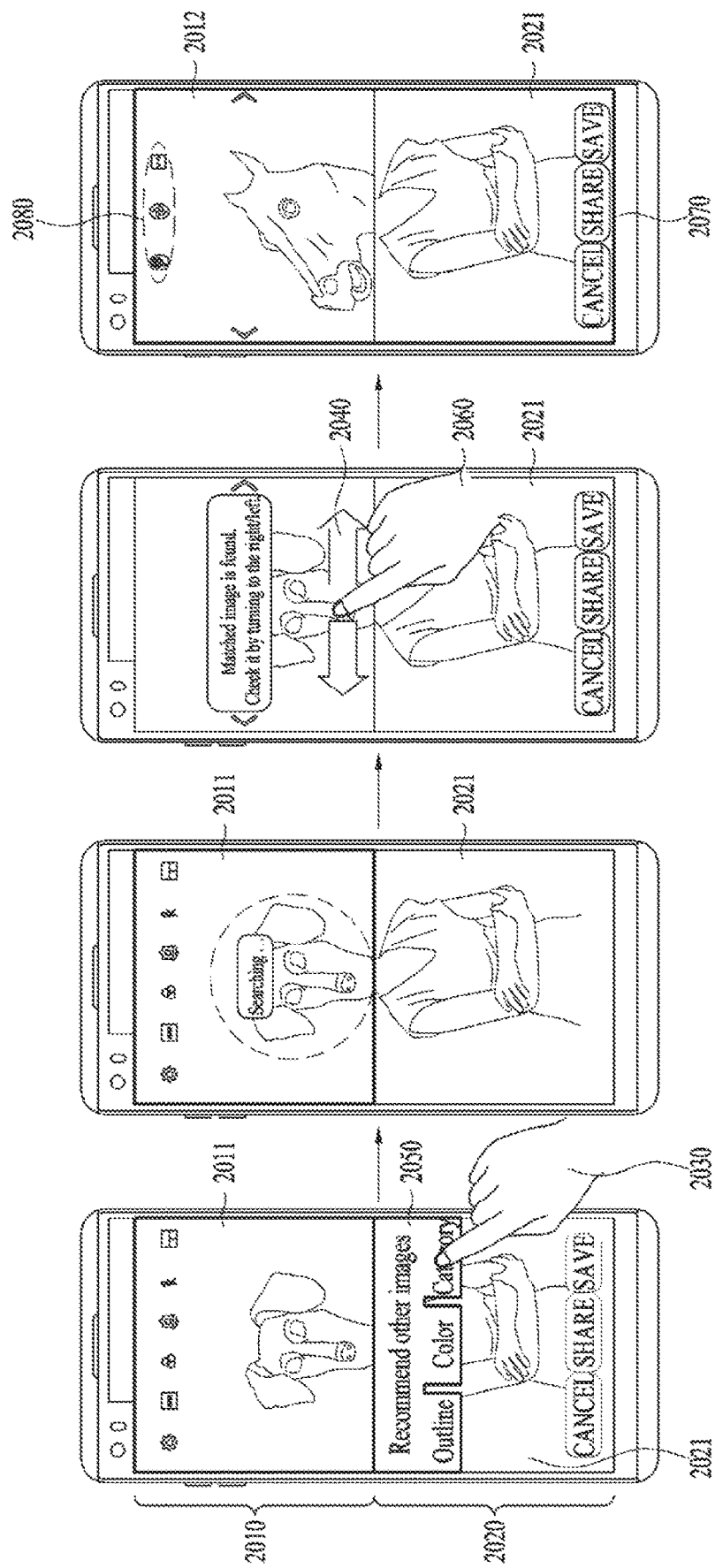
FIG. 20 is a diagram to describe one example of executing a splice mode on the basis of a category in a mobile terminal according to one embodiment of the present invention.

FIG. 20 is a diagram to describe one example of executing a splice mode on the basis of a category in a mobile terminal according to one embodiment of the present invention. In the following description of an embodiment with reference to FIG. 20, description redundant with the former description with reference to FIGS. 4 to 19 shall be omitted.

A first diagram of FIG. 20 corresponds to the first diagram of FIG. 18. Namely, while a first splice image 2011 outputted to a splice region 2010 is selected, a mobile terminal can output a change reference popup 2050.

According to one embodiment of the present invention, the mobile terminal can sense a first input signal 2030 for selecting 'category' from the change reference included in the change reference popup 2050.

Referring to a second diagram of FIG. 20, as sensing the first input single 2030, the mobile terminal can determine the category of a subject contained in the first splice image 2011. The mobile terminal may search other splice images that can be spliced to the first preview image 2021 based on the determined category.

Referring to a third diagram of FIG. 20, if finding a second splice image 2012 that can be spliced to the first preview image 2021, the mobile terminal can output a guide indicator 2040 onto the first splice image 2011. Here, the second splice image 2012 may correspond to an image having the same category of the first splice image 2011.

For example, if the subject contained in the first splice image 2011 is 'dog's head', the mobile terminal can determine the category of the first splice image 2011 as 'animal'. Hence, the mobile terminal can search for 'horse's head' as the second splice image 2012.

According to one embodiment of the present invention, the mobile terminal can sense a second input signal 2060 for selecting the first splice image 2011 in a preset direction based on the guide indicator 2040.

Referring to a fourth diagram of FIG. 20, as sensing the second input signal 2060, the mobile terminal can output the second splice image 2012 to the splice region 2010.

According to one embodiment of the present invention, the mobile terminal can create a coupled image 2070 resulting from splicing the outputted second splice image 2012 and the first preview image 2021 together.

According to one embodiment of the present invention, the mobile terminal may output a search list 2080 for selecting a place for searching for the second splice image 2012. This shall be described in detail with reference to FIG. 21 as follows.

Figure 21:
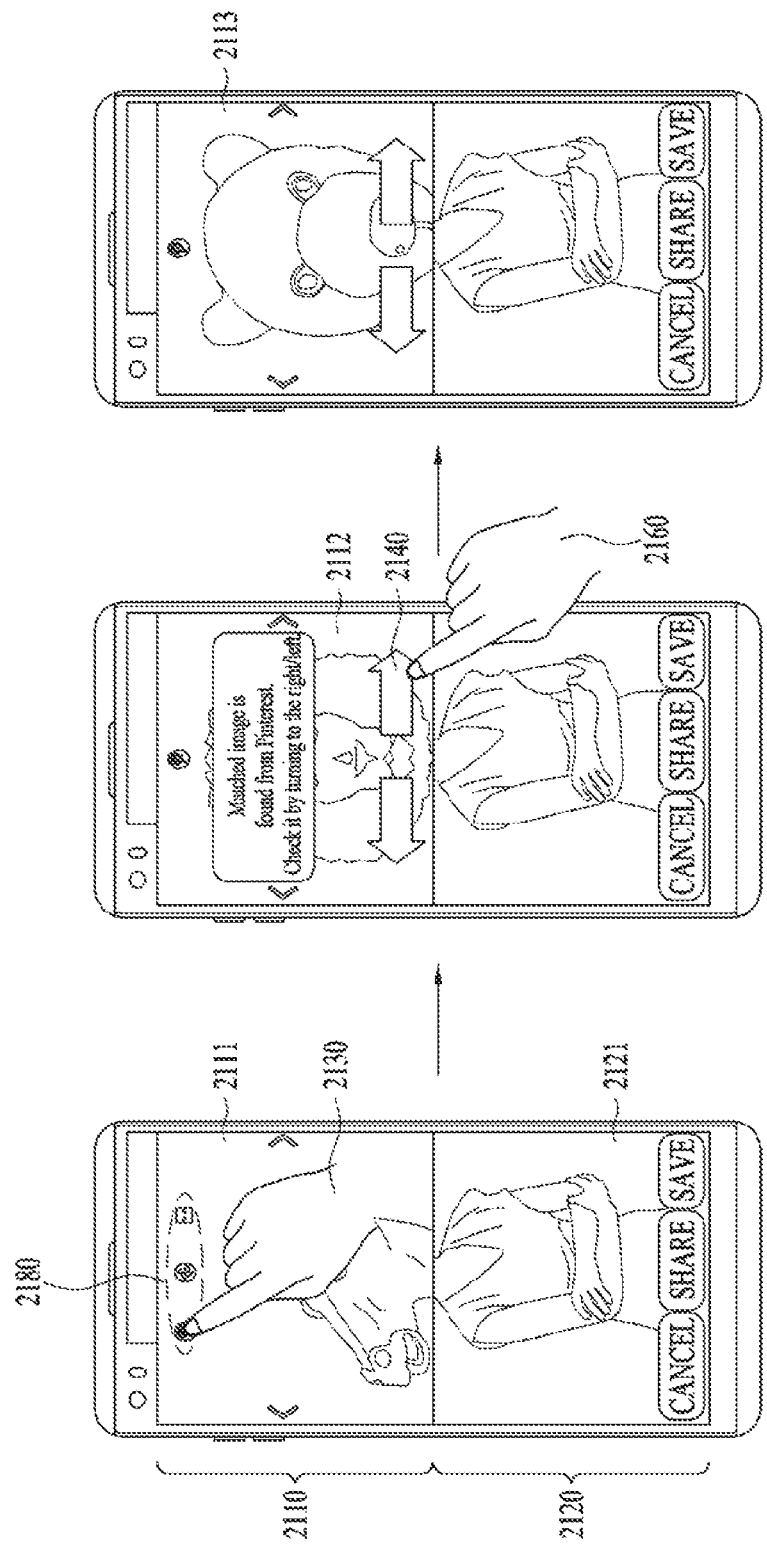
FIG. 21 is a diagram to describe another example of executing a splice mode on the basis of a category in a mobile terminal according to one embodiment of the present invention.

FIG. 21 is a diagram to describe another example of executing a splice mode on the basis of a category in a mobile terminal according to one embodiment of the present invention. In the following description of an embodiment with reference to FIG. 21, description redundant with the former description with reference to FIGS. 4 to 20 shall be omitted.

A first diagram of FIG. 21 corresponds to the third diagram of FIG. 20. Namely, a mobile terminal may correspond to a state of outputting a first splice image 2111 and a preview image 2121 to a splice region 2110 and a preview image region 2120, respectively. Here, a category of a subject contained in the first splice image 2111 may correspond to 'animal'.

According to one embodiment of the present invention, the mobile terminal can output a search list 2180 for selecting a site for searching for other images having the same category of the first splice image 2112. For example, the search list 2180 may include a gallery application, a website, a cloud, an SNS and the like.

According to one embodiment of the present invention, the mobile terminal can sense a first input signal 2130 for selecting a first search site. For example, the first search site may correspond to a website.

Referring to a second diagram of FIG. 21, as sensing the first input signal 2130, the mobile terminal can search the first search site for a second splice image 2112 having the same category of the first splice image 2111.

According to one embodiment of the present invention, if finding the second splice image 2112, the mobile terminal can output the second splice image 2112 to the splice region 2110. If further finding a third splice image 2113 having the same category of the first splice image 2111 from the first search site, the mobile terminal can output a guide indicator 2140 onto the second splice image 2112.

According to one embodiment of the present invention, based on the guide indicator 2140, the mobile terminal can sense a second input signal 2160 for selecting the second splice image 2112 in a preset direction.

Referring to a third diagram of FIG. 21, as sensing the second input signal 2160, the mobile terminal can output the third splice image 2113 to the splice region 2110.

Namely, the mobile terminal can output a plurality of images having the same category of the first splice image 2111 at the selected first search site to the splice region 2110.

Moreover, although not shown in the drawing, the mobile terminal may recommend other images based on the search site. Particularly, based on the first search site, the mobile terminal can output a plurality of images having the same category of the first splice image 2111.

For example, if the first search site is a website outputting a design image, the mobile terminal can output an animal image designed well. On the other hand, if a second search site is a gallery application installed on the mobile terminal, the mobile terminal can output an image captured by a user. If a third search site is an SNS, the mobile terminal can output an animal image outputted to the SNS.

Therefore, the user can use a plurality of images recommended by various search environments as splice images.

Figure 22:
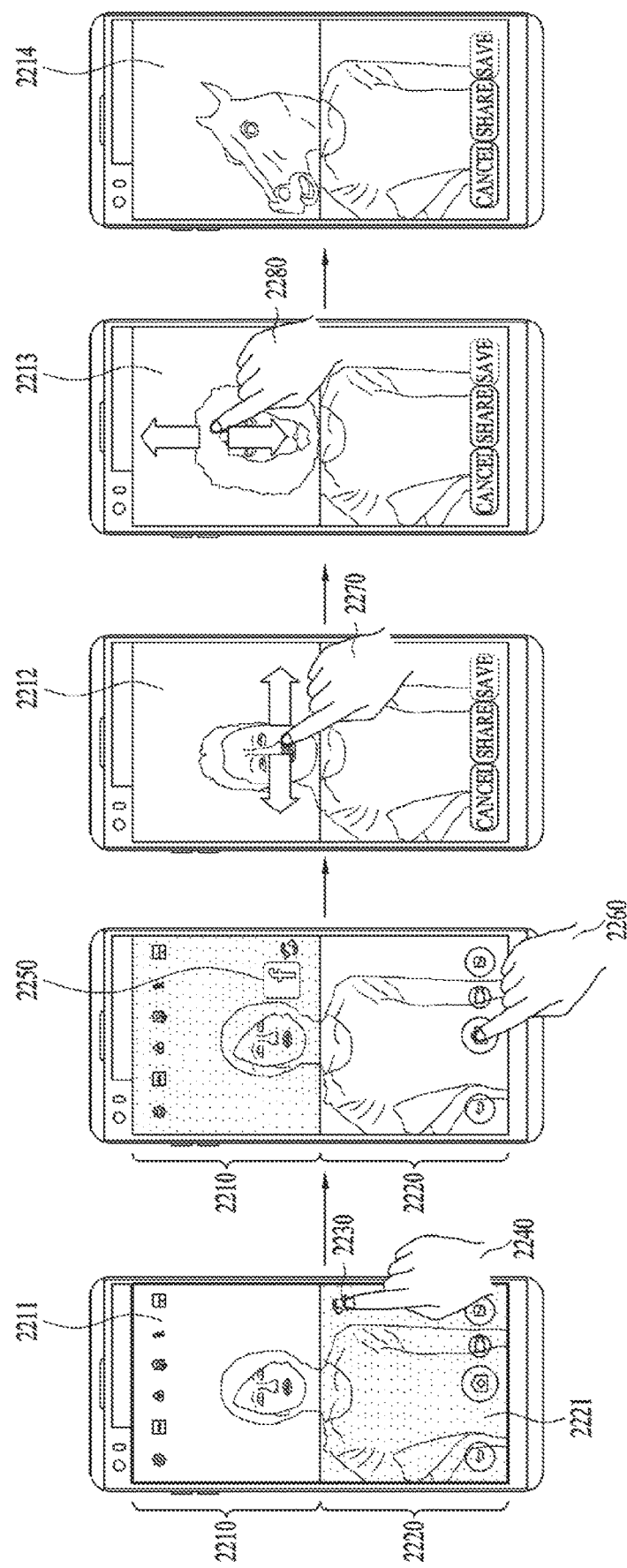
FIG. 22 is a diagram to describe further example of executing a splice mode on the basis of a category in a mobile terminal according to one embodiment of the present invention.

FIG. 22 is a diagram to describe further example of executing a splice mode on the basis of a category in a mobile terminal according to one embodiment of the present invention. In the following description of an embodiment with reference to FIG. 22, description redundant with the former description with reference to FIGS. 4 to 21 shall be omitted.

Referring to a first diagram of FIG. 22, a mobile terminal can output an image through a camera application. In doing so, the mobile terminal can output the image in a manner of partitioning the outputted image into a first image region 2210 and a second image region 2220. Namely, the mobile terminal can output a first image 2211 corresponding to a top of the image and a second image 2221 corresponding to a bottom of the image to the first image region 2210 and the second image region 2220, respectively.

According to one embodiment of the present invention, the mobile terminal can maintain the first image 2211 outputted to the first image region 2210 and the second image 2221 outputted to the second image region 2220 as a photographable region and a splice region, respectively.

According to one embodiment of the present invention, the mobile terminal can output a function swap icon 2230. Here, the function swap icon 2230 may correspond to an icon for swapping functions of the first image region 2210 and the second image region 2220.

Namely, as sensing a first input signal 2240 for selecting the function swap icon 2230, the mobile terminal can maintain the first image 2211 outputted to the first image region 2210 and the second image 2221 outputted to the second image region 2220 as the splice region and the photographable region, respectively.

Referring to a second diagram of FIG. 22, the mobile terminal can change the first image 2211 maintained as the splice region.

Particularly, the mobile terminal can search for a first splice image 2212 based on a category of the first image 2211. In doing so, the mobile terminal determines a subject contained in the first image 2211, thereby being able to determine a search site to search for the first splice image 2212.

According to one embodiment of the present invention, if the search site to search for the first splice image 2212 is determined, the mobile terminal can output a search site icon 2250 onto the first image 2211.

According to one embodiment of the present invention, while the search site icon 2250 is outputted, the mobile terminal can sense a second input signal 2260 for capturing the second image 2221.

Referring to a third diagram of FIG. 22, as sensing the second input signal 2260, the mobile terminal can capture and output the second image 2221 to the second image region 2220.

According to one embodiment of the present invention, the mobile terminal can output the first splice image 2212 having the same category of the subject contained in the first image 2210 to the first image region 2210. For example, if the subject contained in the first image 2221 corresponds to a first human face, the first splice image 2212 may correspond to a second human face.

According to one embodiment of the present invention, while the first splice image 2212 is outputted, the mobile terminal can sense a third input signal 2270 for selecting the first splice image 2212 in a first direction. For example, the first direction may correspond to a left-right direction.

Referring to a fourth diagram of FIG. 22, as sensing the third input signal 2270, the mobile terminal can search the search site for a second splice image 2213 having a category different from that of the first splice image 2212 and then output the second splice image 2213. The above example is described as follows. First of all, if the first splice image 2212 is the second human face, the second splice image 2213 may correspond to a first animal face.

According to one embodiment of the present invention, while the second splice image 2213 is outputted, the mobile terminal can sense a fourth input signal 2280 for selecting the second splice image 2213 in a second direction. Here, the second direction may correspond to a direction different from the first direction. For example, the second direction may correspond to a top-bottom direction.

Referring to a fifth direction of FIG. 22, as sensing the fourth input signal 2280, the mobile terminal can search the search site for a third splice image 2214 having the same category of the second splice image 2213 and then output the third splice image 2214. The above example is described as follows. First of all, if the second splice image 2213 is the first animal face, the third splice image 2214 may correspond to a second animal face.

Figure 23:
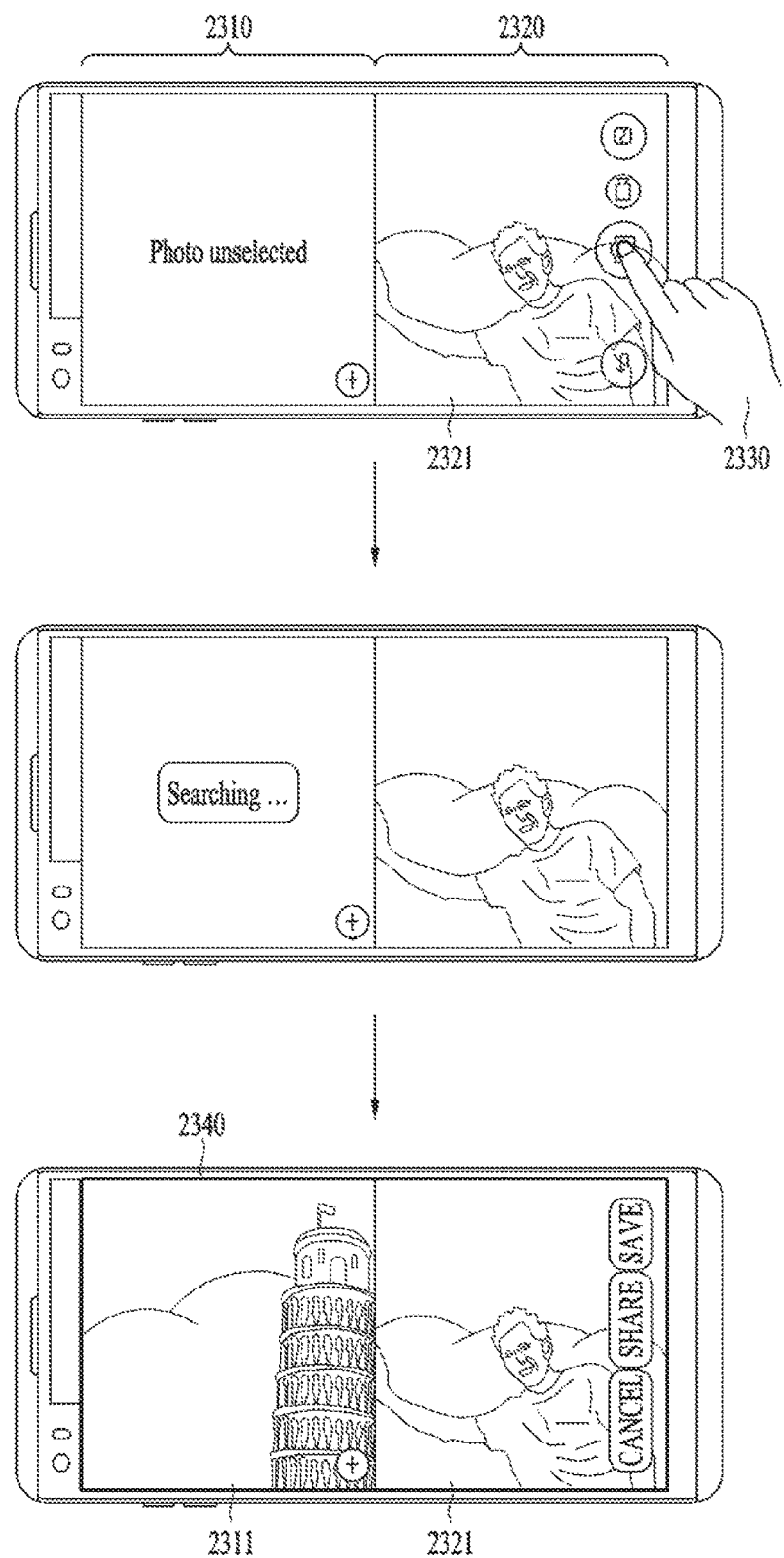
FIG. 23 is a diagram to describe one example of executing a splice mode on the basis of a location in a mobile terminal according to one embodiment of the present invention.

FIG. 23 is a diagram to describe one example of executing a splice mode on the basis of a location in a mobile terminal according to one embodiment of the present invention. In the following description of an embodiment with reference to FIG. 23 description redundant with the former description with reference to FIGS. 4 to 22 shall be omitted.

Referring to a first diagram of FIG. 23, a mobile terminal can execute a splice mode through a camera application. The mobile terminal can output a region to a display unit by partitioning it into a splice region 2310 and a preview image region 2320.

According to one embodiment of the present invention, the mobile terminal can output a preview image to the preview image region 2320. While the preview image 2321 is outputted, the mobile terminal can sense a first input signal 2330 for capturing the preview image 2321.

Referring to a second diagram of FIG. 23, as sensing the first input signal 2330, the mobile terminal can output the captured preview image to the preview image region 2320.

According to one embodiment of the present invention, the mobile terminal can detect a pose of a subject contained in the captured preview image 2321. Moreover, the mobile terminal can detect an action of the subject contained in the captured preview image 2321.

According to one embodiment of the present invention, based on the detected pose of the subject, the mobile terminal can search for an image outputted to the splice region 2310. Particularly, the mobile terminal can search for a splice image 2311 connectible to the action of the subject contained in the preview image 2321.

Referring to a third diagram of FIG. 23, after finding the splice image 2311, the mobile terminal can output the splice image 2311 to the splice region 2310. For example, the subject contained in the preview image 2321 may take an action of pushing something with a right hand. The mobile terminal detects the subject's action, thereby being able to search for an image of 'the Leaning Tower of Pisa' as the splice image 2311.

According to one embodiment of the present invention, the mobile terminal may output the splice image 2311 and the preview image 2321 to the splice region 2310 and the preview image region 2320, respectively. The mobile terminal can create a coupled image 2340 by naturally splicing the outputted splice image 2311 and the outputted preview image 2321 together.

Therefore, the mobile terminal can shoot the preview image 2321, recommend the splice image 2311 matching the pose of the subject contained in the preview image 2321, and then output the recommended image 2311. And, the mobile terminal may create a new image by splicing the splice image 2311 and the preview image 2321 together.

Figure 24:
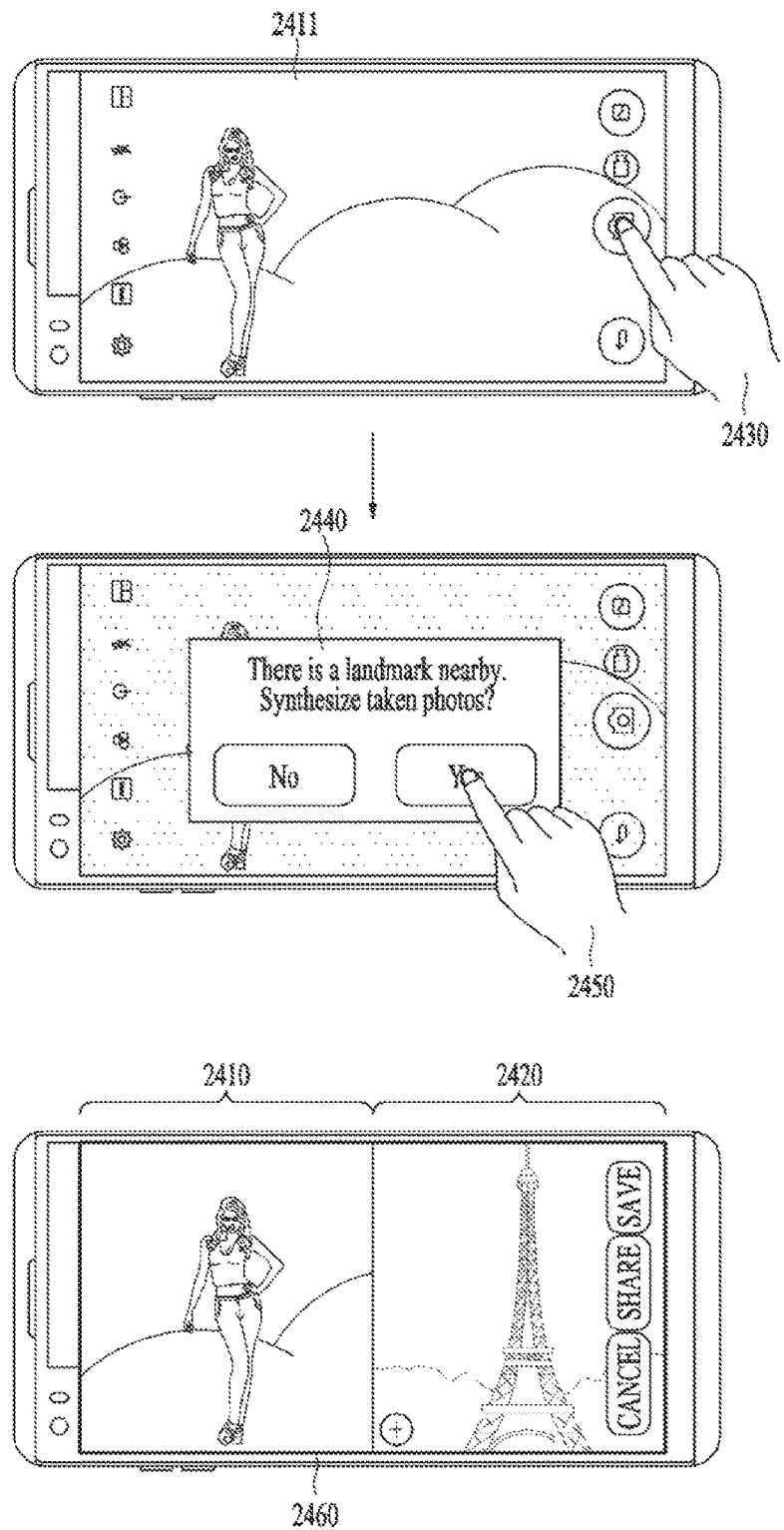
FIG. 24 is a diagram to describe another example of executing a splice mode on the basis of a location in a mobile terminal according to one embodiment of the present invention.

FIG. 24 is a diagram to describe another example of executing a splice mode on the basis of a location in a mobile terminal according to one embodiment of the present invention. In the following description of an embodiment with reference to FIG. 24, description redundant with the former description with reference to FIGS. 4 to 23 shall be omitted.

Referring to a first diagram of FIG. 24, a mobile terminal can output a preview image 2411, which is currently shot using a camera, through a camera application. According to one embodiment of the present invention, the mobile terminal can sense a first input signal 2430 for capturing the preview image 2411.

Referring to a second diagram of FIG. 24, as sensing the first input signal 2430, the mobile terminal can determine a current location at which the preview image 2411 is currently shot. Particularly, the mobile terminal can determine the location at which the preview image 2411 is currently shot through a location information module of a wireless communication unit.

According to one embodiment of the present invention, the mobile terminal can search for a splice image 2421 based on the determined location. Particularly, the mobile terminal can search whether a landmark exists within a preset range from a current location at which the preview image 2411 is currently shot. For example, if the mobile terminal shoots the preview image 2411 near the Eiffel Tower, the mobile terminal can determine the Eiffel Tower as a landmark and search for 'Eiffel Tower image'.

According to one embodiment of the present invention, if the splice image 2421 is found, the mobile terminal can output a recommended image popup 2440. Here, the recommended image popup 2440 may correspond to a popup for querying whether to connect the found splice image 2421.

According to one embodiment of the present invention, the mobile terminal can sense a second input signal 2450 for connecting the splice image 2421 through the recommended image popup 2440.

Referring to a third diagram of FIG. 24, as sensing the second input signal 2450, the mobile terminal can output the preview image 2411 and the found spice image 2421 to the preview image region 2410 and the splice region 2420, respectively.

According to one embodiment of the present invention, for the connection to the splice image 2421, the mobile terminal can adjust a size, location and direction of the preview image 2411 centering on a subject contained in the preview image 2411.

Thereafter, the mobile terminal creates a coupled image 2460 by splicing the preview image 2411 and the splice image 2421 together, thereby saving or sharing the coupled image 2460.

Figure 25:
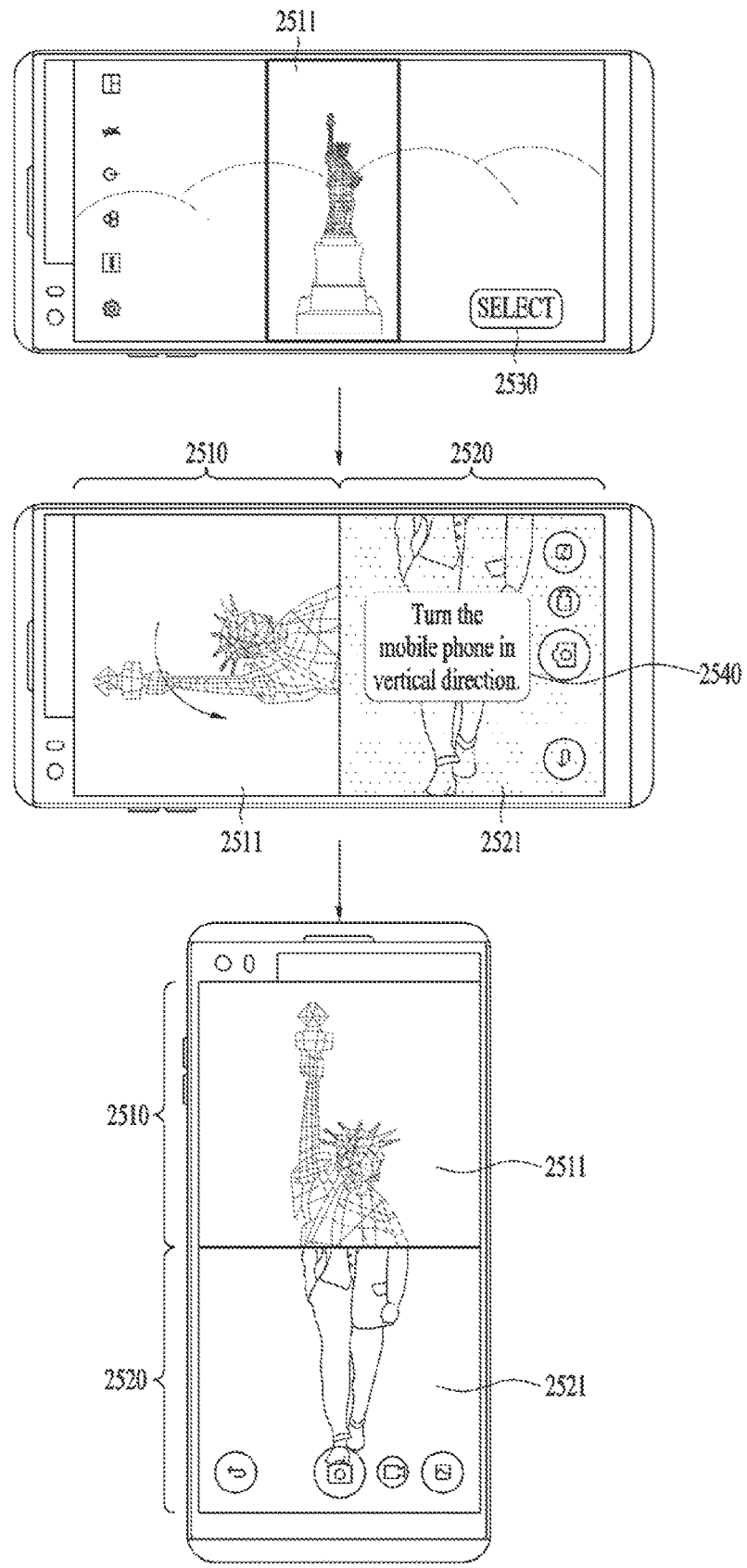
FIG. 25 is a diagram to describe one example of executing a splice mode on the basis of a direction of a subject in a mobile terminal according to one embodiment of the present invention.

FIG. 25 is a diagram to describe one example of executing a splice mode on the basis of a direction of a subject in a mobile terminal according to one embodiment of the present invention. In the following description of an embodiment with reference to FIG. 25, description redundant with the former description with reference to FIGS. 4 to 24 shall be omitted.

Referring to a first diagram of FIG. 25, a mobile terminal can output a splice image 2511 thorough a gallery application or a camera application. Here, the splice image 2511 may contain a subject in a vertical direction. According to one embodiment of the present invention, the mobile terminal can sense a first input signal 2530 for selecting the splice image 2511.

Referring to a second diagram of FIG. 25, as sensing the first input signal 2530, the mobile terminal can execute a splice mode on the camera application. According to one embodiment of the present invention, as sensing the first input signal 2530, the mobile terminal can output the splice image 2511 and a preview image currently shot through a camera to the splice region 2510 and the preview image region 2520, respectively.

When the mobile terminal outputs the splice image 2511 to the splice region 2510, the mobile terminal can adjust a size, location and direction of the splice image 2511 centering on the subject contained in the splice image 2511.

According to one embodiment of the present invention, since the subject contained in the splice image 2511 is in a vertical direction, the mobile terminal can rotate to output the splice image 2511 in the splice region 2510. In order to naturally connect the splice image 2511 and the preview image 2521 to each other, the mobile terminal can enlarge to output the splice image 2511.

According to one embodiment of the present invention, the mobile terminal can output a guide popup 2540 instructing to change a direction of the preview image 2511 based on the direction of the subject contained in the splice image 2511. For example, if the subject contained in the splice image 2511 is in a vertical direction, the mobile terminal can guide the mobile terminal to be rotated in the vertical direction in the preview image 2520.

Referring to a third diagram of FIG. 25, the mobile terminal having rotated in the vertical direction can output the splice image 2511 and the preview image 2521 to the splice region 2510 and the preview image region 2520, respectively.

According to one embodiment of the present invention, the mobile terminal can capture the preview image 2521 connected to the splice region 2511 by checking the image 2521.

Figure 26:
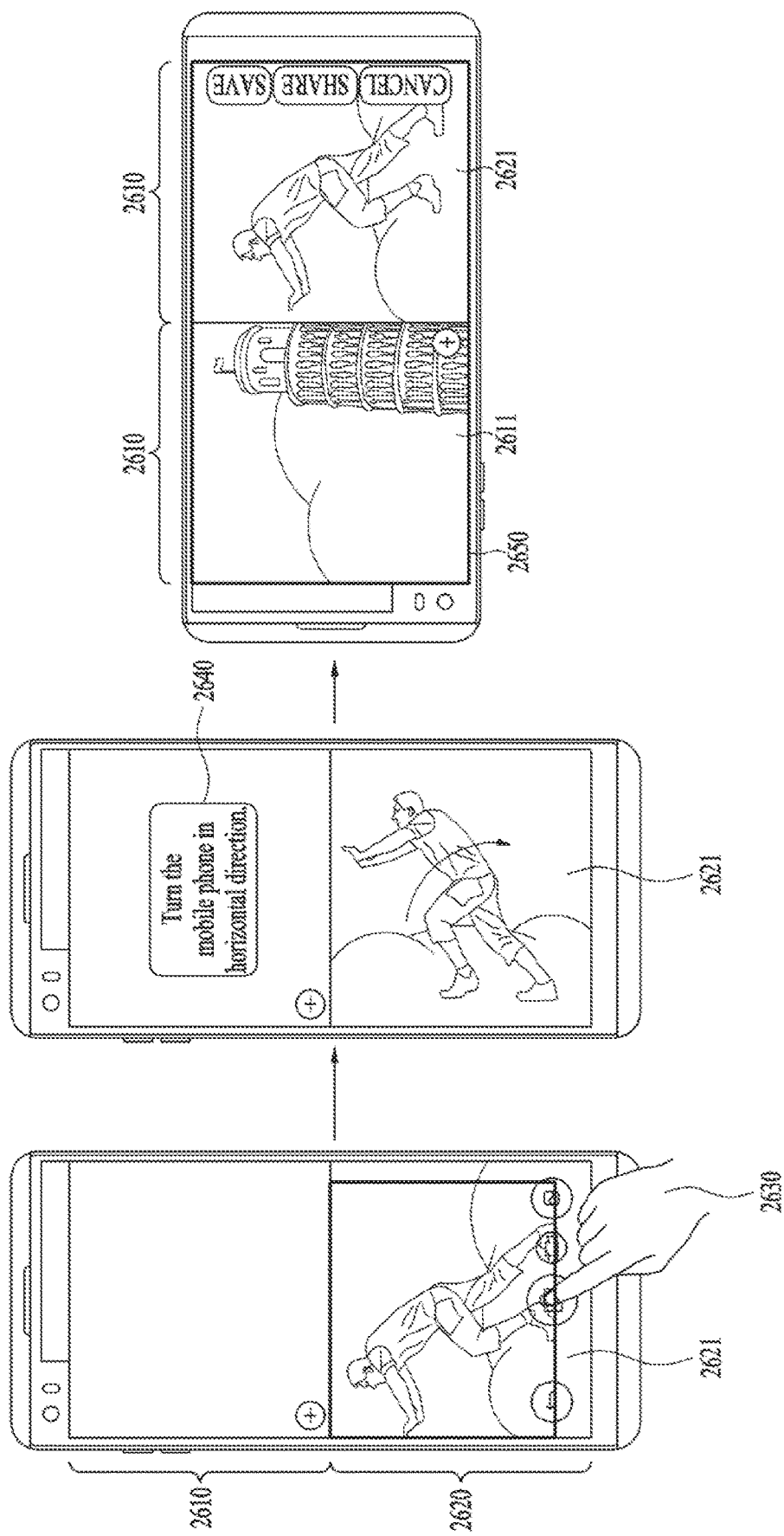
FIG. 26 is a diagram to describe another example of executing a splice mode on the basis of a direction of a subject in a mobile terminal according to one embodiment of the present invention.

FIG. 26 is a diagram to describe another example of executing a splice mode on the basis of a direction of a subject in a mobile terminal according to one embodiment of the present invention. In the following description of an embodiment with reference to FIG. 26, description redundant with the former description with reference to FIGS. 4 to 25 shall be omitted.

Referring to a first diagram of FIG. 26, a mobile terminal can execute a splice mode through a camera application. The mobile terminal can output a preview image 2621 currently shot through a camera to a preview image region 2620. For example, a subject contained in the preview image 2621 is taking an action of pushing something in a left direction with both hands.

According to one embodiment of the present invention, the mobile terminal can sense a first input signal 2630 for capturing the preview image 2621. As sensing the first input signal 2630, the mobile terminal can detect a direction of the subject contained in the preview image 2621. The above example is described as follows. First of all, the mobile terminal can detect that the subject contained in the preview image 2621 takes an action of pushing in a left direction.

Referring to a second diagram of FIG. 26, the mobile terminal can automatically rotate the preview image 2621. Particularly, if detecting that the subject contained in the preview image 2621 takes an action of pushing in a left direction, the mobile terminal can rotate the preview image 2621 by 90 degrees clockwise in order to splice an action of pushing the splice image 2611 that will be outputted to the splice region 2610.

According to one embodiment of the present invention, as the preview image 2621 is rotated, the mobile terminal can output a guide popup 2640 indicating a rotation of the mobile terminal to the splice region 2610. For example, the mobile terminal can output the guide popup 2640 indicating to rotate the mobile terminal in a horizontal direction.

Referring to a third diagram of FIG. 26, the mobile terminal having rotated in the horizontal direction can output the splice image 2611 and the preview image 2621 to the splice region 2610 and the preview image region 2620, respectively. Here, the splice image 2611 may correspond to an image recommended on the basis of the action of the subject contained in the preview image 2621.

According to one embodiment of the present invention, the mobile terminal creates a coupled image 2650 resulting from splicing the splice image 2611 and the preview image 2621 together, thereby being able to save or share the coupled image 2650.

Figure 27:
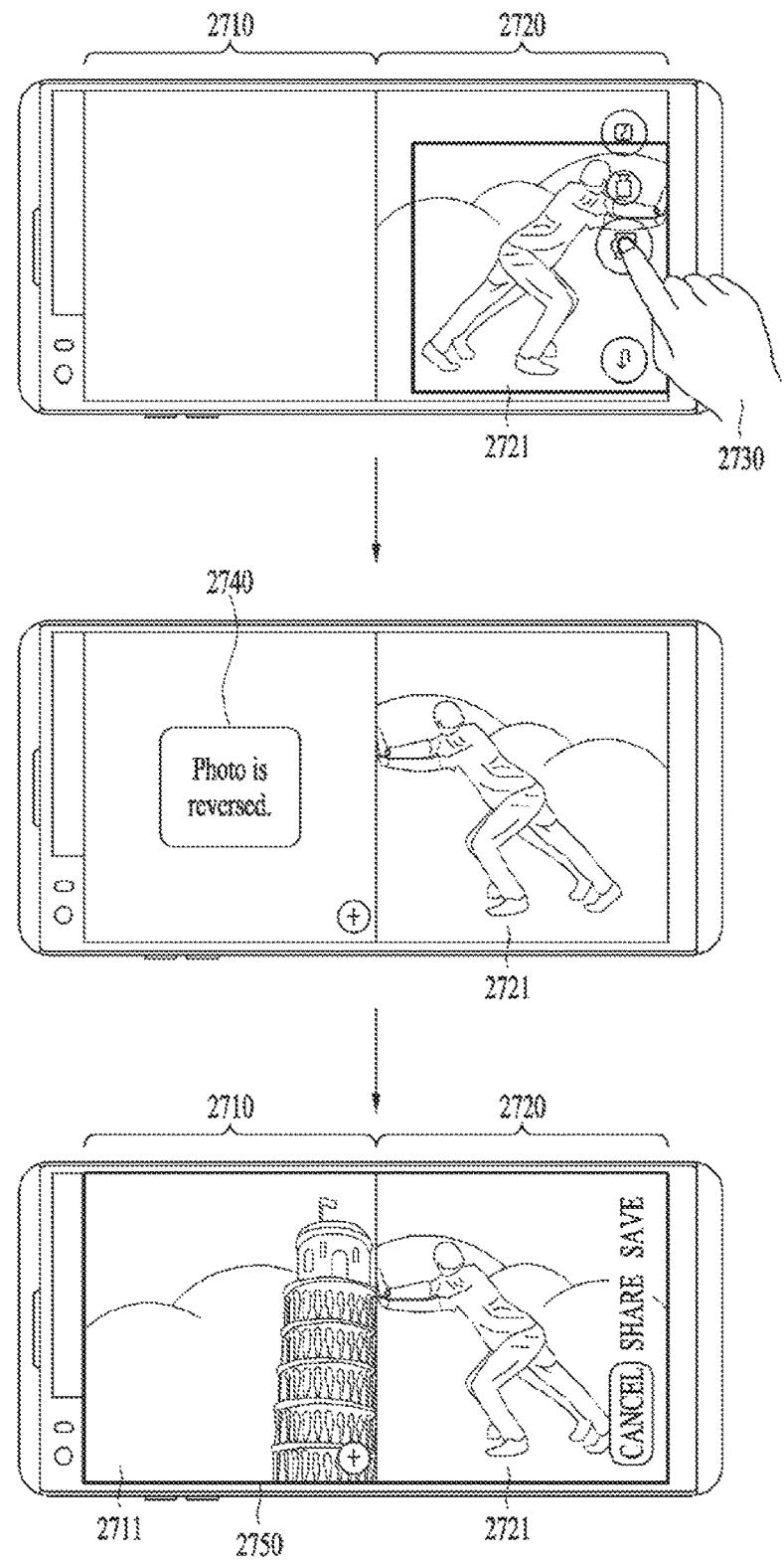
FIG. 27 is a diagram to describe further example of executing a splice mode on the basis of a direction of a subject in a mobile terminal according to one embodiment of the present invention.

FIG. 27 is a diagram to describe further example of executing a splice mode on the basis of a direction of a subject in a mobile terminal according to one embodiment of the present invention. In the following description of an embodiment with reference to FIG. 27, description redundant with the former description with reference to FIGS. 4 to 26 shall be omitted.

Referring to a first diagram of FIG. 27, a mobile terminal can execute a splice mode through a camera application. The mobile terminal can output a preview image 2721 currently shot through a camera to a preview image region 2720. For example, a subject contained in the preview image 2721 is taking an action of pushing something in a right direction with both hands.

According to one embodiment of the present invention, the mobile terminal can sense a first input signal 2730 for capturing the preview image 2721. As sensing the first input signal 2730, the mobile terminal can detect a direction of the subject contained in the preview image 2721. The above example is described as follows. First of all, the mobile terminal can detect that the subject contained in the preview image 2721 takes an action of pushing in a right direction.

Referring to a second diagram of FIG. 27, the mobile terminal can automatically reverse the preview image 2721 right and left. Particularly, if detecting that the subject contained in the preview image 2721 takes an action of pushing in a right direction, the mobile terminal can reverse the preview image 2721 right and left in order to splice an action of pushing the splice image 2711 that will be outputted to the splice region 2710.

According to one embodiment of the present invention, as the preview image 2721 is reversed, the mobile terminal can output a guide popup 2740 indicating the reversal of the preview image 2721 to the splice region 2710.

Referring to a third diagram of FIG. 27, the mobile terminal can output the splice image 2711 and the preview image 2721 to the splice region 2710 and the preview image region 2720, respectively. Here, the splice image 2711 may correspond to an image recommended on the basis of the action of the subject contained in the preview image 2721.

According to one embodiment of the present invention, the mobile terminal creates a coupled image 2750 resulting from splicing the splice image 2711 and the preview image 2721 together, thereby being able to save or share the coupled image 2750.

Figure 28:
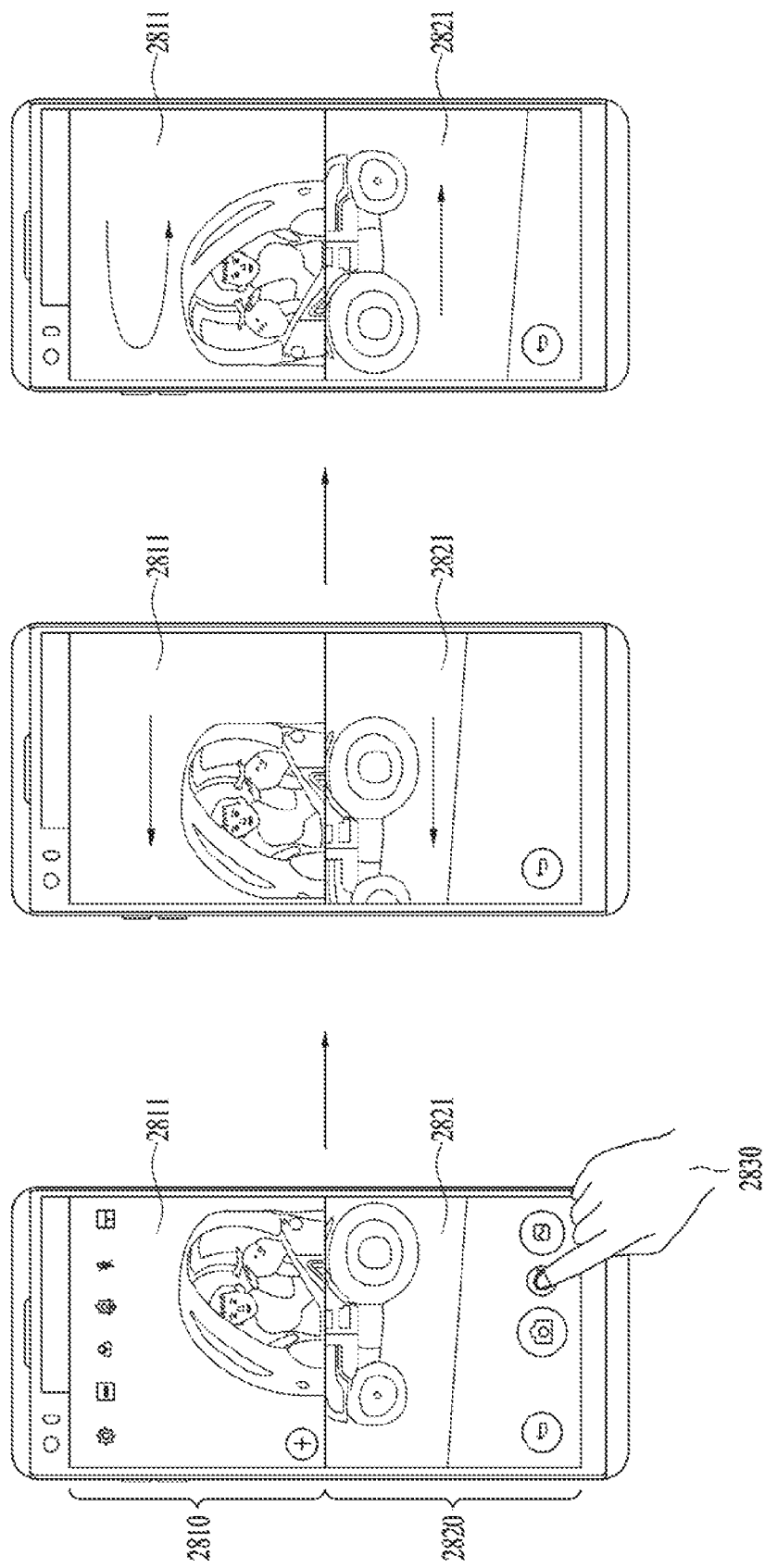
FIG. 28 is a diagram to describe one example of executing a splice mode on the basis of a moving speed or a moving direction of a subject in a mobile terminal according to one embodiment of the present invention.

FIG. 28 is a diagram to describe one example of executing a splice mode on the basis of a moving speed or a moving direction of a subject in a mobile terminal according to one embodiment of the present invention. In the following description of an embodiment with reference to FIG. 28, description redundant with the former description with reference to FIGS. 4 to 25 shall be omitted.

Referring to a first diagram of FIG. 28, a mobile terminal can execute a splice mode through a camera application. In doing so, the mobile terminal can output a splice mage 2811 and a preview image 2821 to a splice region 2810 and a preview image region 2820, respectively. Here, the slice image 2811 may contain a first subject and the preview image 2821 may contain a second subject.

According to one embodiment of the present invention, the mobile terminal can sense a first input signal 2830 for recording the preview image 2821.

Referring to a second diagram of FIG. 28, as sensing the first input signal 2830, the mobile terminal can record the preview image 2821 outputted to the preview image region 2820 since the timing of sensing the first input signal 2830.

According to one embodiment of the present invention, the mobile terminal can detect at least one of a moving speed and direction of the second subject contained in the currently recorded preview image 2821. For example, the second subject may move from right to left at the speed of 2 km/h.

According to one embodiment of the present invention, the mobile terminal can control the first subject contained in the splice image 2811 to move based on at least one of the moving speed and direction of the second subject. The above example is described as follows. First of all, as detecting that the second subject is moving from right to left at the speed of 2 km/h, the mobile terminal can control the first subject to move from right to left at the speed of 2 km/h. In doing so, the mobile terminal can move the first subject as if the first subject contained in the splice image 2811 and the second subject contained in the preview image 2821 move together.

Referring to a third diagram of FIG. 28, the mobile terminal can detect that the second subject contained in the preview image 2821 changes the moving direction. As detecting that the moving direction of the second subject is changed, the mobile terminal can change the moving direction of the first subject.

According to one embodiment of the present invention, while the preview image 2821 is recorded, the mobile terminal can control the first subject to move based on at least one of a moving speed and direction of the second subject. Hence, the first subject contained in the splice image 2811 and the second subject contained in the preview image 2821 can be recorded as moving together.

Thereafter, the mobile terminal can record and save the splice image 2811 and the preview image 2821 in a splice state.

Besides, although the drawings are described separately for clarity, it is possible to implement new embodiments by merging the embodiments described in the respective drawings.

Figure 29:
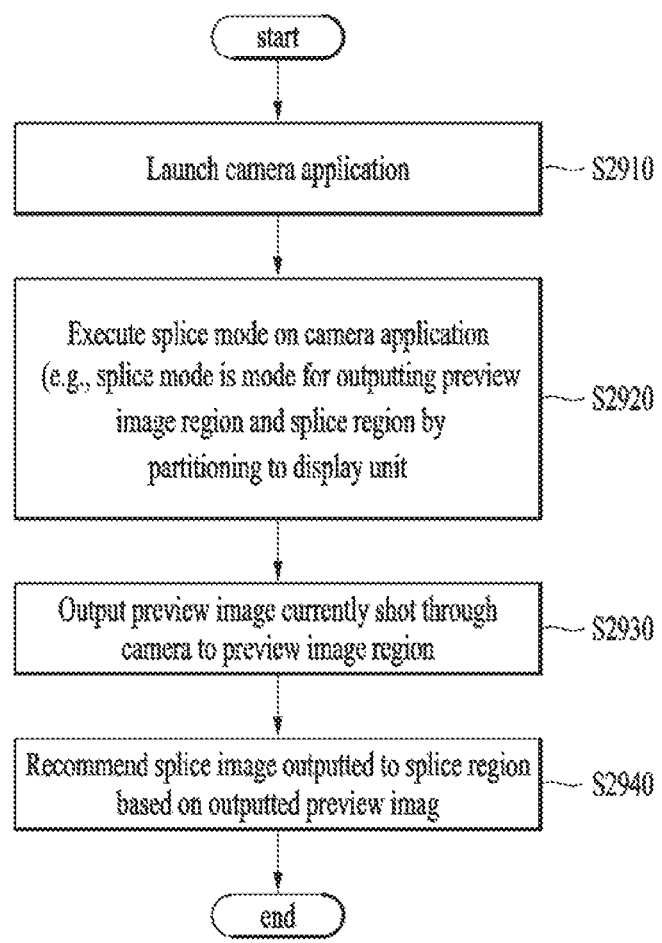
FIG. 29 is a flowchart to describe one example of executing a splice mode in a mobile terminal according to one embodiment of the present invention.

FIG. 29 is a flowchart to describe one example of executing a splice mode in a mobile terminal according to one embodiment of the present invention. The respective steps described with reference to FIG. 29 can be controlled by the controller of FIG. 1A.

In a step S2910, a mobile terminal can launch a camera application. In doing so, the mobile terminal can output various control icons for capturing or recording a preview image through the camera application. Particularly, a mode change icon for changing a mode of the camera application and a simultaneous/sequential shot mode change icon can be outputted together.

In a step S2920, the mobile terminal can execute a splice mode on the camera application. Here, the splice mode may correspond to a mode for outputting a preview image region and a splice region onto a display unit by partitioning. And, the splice mode may correspond to a mode settable on the camera application.

In a step S2930, the mobile terminal can output a preview image currently shot through a camera to the preview image region.

In a step S2940, the mobile terminal can recommend a splice image outputted to the splice region based on the outputted preview image. The mobile terminal can recommend a splice image based on at least one of an outline, color and category of the outputted preview image. And, the mobile terminal can pan, rotate, enlarge and reduce the recommended splice image to splice to the preview image.

Moreover, it is a matter of course that the former embodiments described with reference to FIGS. 5 to 28 can be implemented as a mobile terminal controlling method like FIG. 29.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

What is claimed is:

1. A mobile terminal, comprising:
   a sensing unit;
   a camera;
   a display unit; and
   a controller configured to:
      launch a camera application;
      execute a splice mode on the camera application, wherein the splice mode is a mode configured for displaying a preview image region and a splice region in the display unit by partitioning a display area of the display unit;
      cause the display unit to display a preview image currently shot through the camera in the preview image region;
      recommend a first splice image, for splicing to the preview image, by displaying the first splice image in the splice region based on the displayed preview image;
      detect an orientation of a first subject contained in the first splice image and an orientation of the mobile terminal;
      cause the display unit to display guide information instructing to change the orientation of the mobile terminal based on the orientation of the first subject contained in the first splice image; and
      in response to sensing an input signal for selecting the preview image or the first splice image, change the selected preview or first splice image.

2. The mobile terminal of claim 1, further comprising:
   a memory; and
   a wireless communication unit, wherein the controller obtains the first splice image from the memory or via the wireless communication unit.

3. The mobile terminal of claim 2, wherein the controller is further configured to recommend the first splice image based on at least one selected from the group consisting of an outline, color and category of the preview image.

4. The mobile terminal of claim 3, wherein the controller is further configured to pan, rotate, enlarge, or reduce at least one of the first splice image or the preview image based on the first splice image or the preview image.

5. The mobile terminal of claim 3, wherein at least one of a pan, rotation, enlargement, or reduction operation on the first splice image or the preview image is performed based on a user's input.

6. The mobile terminal of claim 3, wherein the controller is further configured to recommend the first splice image based on the outline of the preview image, cause the display unit to display the recommended first splice image in the splice region, and recommend a second splice image based on the outline of the preview image in response to sensing an input signal for selecting the first splice image.

7. The mobile terminal of claim 4, wherein the controller is further configured to extract an outline of at least one of the first splice image or the preview image and pan, rotate, enlarge, or reduce at least one of the first splice image or the preview image based on the extracted outline.

8. The mobile terminal of claim 3, wherein the controller is further configured to recommend the first splice image based on the color of the preview image, cause the display unit to display the first splice image in the splice region, and change a color of at least one of the preview image or the first splice image in response to sensing an input signal for selecting the preview image or the first splice image.

9. The mobile terminal of claim 8, wherein in response to sensing the input signal, the controller is further configured to extract at least one color included in the preview image or the first splice image, cause the display unit to display an extracted color list, and change the color of at least one of the preview image or the first splice image based on a color selected from the extracted color list.

10. The mobile terminal of claim 3, wherein the controller is further configured to recommend the first splice image based on the category of the preview image, cause the display unit to display the first splice image in the splice region, recommend a second splice image having a same category as the first splice image in response to sensing a first input signal for selecting the first splice image in a first direction, and recommend a third splice image having a category different from a category of the first splice image in response to sensing a second input signal for selecting the first splice image in a second direction.

11. The mobile terminal of claim 2, wherein the wireless communication unit comprises a location information module and wherein the controller is further configured to determine a location at which the preview image is shot through the location information module, and recommend the first splice image based on the determined location.

12. The mobile terminal of claim 1, wherein the controller is further configured to capture the preview image combined with the first splice image.

13. The mobile terminal of claim 1, wherein the controller is further configured to detect an orientation of a second subject contained in the preview image, rotate the preview image based on the detected orientation of the second subject, and cause the display unit to display the guide information instructing to change the orientation of the mobile terminal based on the orientation of the second subject.

14. The mobile terminal of claim 1, wherein the controller is further configured to detect at least one of a moving speed or direction of a second subject contained in the preview image and cause the first subject contained in the first splice image to move based on at least one of the moving speed or direction of the second subject.

15. The mobile terminal of claim 1, wherein, while the preview image and the first splice image are displayed, in response to rotation of the mobile terminal, the controller is further configured to control the splice region such that the first splice image is not rotated automatically.

16. The mobile terminal of claim 2, wherein the controller is further configured to create a single image by splicing the displayed preview image and the recommended first splice image together and to save at least one of the preview image, the first splice image, or the created image.

17. The mobile terminal of claim 16, wherein the controller is further configured to share at least one of the preview image, the first splice image, or the created image with an external device or server through the wireless communication unit.

18. A method of controlling a mobile terminal, the method comprising:
launching a camera application;
executing a splice mode on the camera application, the splice mode being a mode for displaying a preview image region and a splice region in a display unit by partitioning a display area of the display unit;
displaying a preview image currently shot through a camera in the preview image region;
displaying a recommended first splice image, for splicing to the preview image, in the splice region based on the preview image;
detecting an orientation of a first subject contained in the first splice image and an orientation of the mobile terminal;
displaying guide information instructing to change the orientation of the mobile terminal based on the orientation of the first subject contained in the first splice image; and
in response to sensing an input signal for selecting the preview image or the first splice image, changing the selected preview or first splice image.

19. The method of claim 18, further comprising:
obtaining the first splice image from a memory or via a wireless communication unit.

* * * * *